(12) United States Patent
Schmidt et al.

(10) Patent No.: US 6,384,908 B1
(45) Date of Patent: *May 7, 2002

(54) ORIENTATION DEPENDENT RADIATION SOURCE

(75) Inventors: Karl B. Schmidt, Wauwatosa; Brian S. R. Armstrong, Milwaukee, both of WI (US)

(73) Assignee: Go Sensors, LLC, Sarasota, FL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/317,052

(22) Filed: May 24, 1999

Related U.S. Application Data

(63) Continuation-in-part of application No. 08/698,115, filed on Aug. 15, 1996, now Pat. No. 5,936,723, and a continuation-in-part of application No. 08/698,357, filed on Aug. 15, 1996, now Pat. No. 5,936,722.

(51) Int. Cl.$^7$ .............................. G01B 11/26; G01C 1/00
(52) U.S. Cl. .............................. 356/152.3; 356/139.03; 356/152.2
(58) Field of Search .................... 356/152.1, 139.03, 356/141.3, 141.5, 152.2, 152.3

(56) References Cited

U.S. PATENT DOCUMENTS 2,982,859 A * 5/1961 Steinbrecher
2,991,743 A 7/1961 Ogle (List continued on next page.)

FOREIGN PATENT DOCUMENTS

DE 199 10 107 A1 9/1999
EP 0 329 438 A1 8/1989

(List continued on next page.)

OTHER PUBLICATIONS

International Search Report from International Patent Application PCT/US99/11451.
International Search Report from International Patent Application PCT/US00/31118.

(List continued on next page.)

*Primary Examiner*—Stephen C. Buczinski
(74) *Attorney, Agent, or Firm*—Wolf, Greenfield & Sacks, P.C.

(57) ABSTRACT

Methods and apparatus for producing orientation dependent radiation, and orientation detection systems are disclosed. An orientation dependent radiation source directs radiation to an observation area and facilitates a determination of the orientation of the orientation dependent source from the observation area. In particular, the orientation dependent source produces a radiation pattern having one or more detectable centroids that vary in position across an observation surface of the orientation dependent source as observed from the observation area, based on a rotation of the orientation dependent source about one or more axes of rotation. According to various embodiments, the orientation dependent radiation source may include one or more primary radiation sources or secondary sources, such as reflectors. One or more orientation dependent sources may be employed in an orientation detection system according to the invention which includes a radiation sensor located in the observation area to detect the orientation dependent radiation pattern produced by one or more orientation dependent radiation sources. Additionally, the radiation pattern produced by an orientation dependent source may be visibly observable, allowing an observer to qualitatively determine the orientation of the source from the observation area.

168 Claims, 19 Drawing Sheets

U.S. PATENT DOCUMENTS

| | | | |
|---|---|---|---|
| 3,194,563 A | | 7/1965 | Mackniesh |
| 3,601,408 A | | 8/1971 | Wright |
| 3,617,131 A | * | 11/1971 | Taguchi |
| 3,648,229 A | | 3/1972 | Burrows et al. |
| 3,662,180 A | | 5/1972 | Jorgensen et al. |
| 3,697,183 A | | 10/1972 | Knight et al. |
| 3,711,203 A | * | 1/1973 | Sato et al. |
| 3,714,657 A | * | 1/1973 | Lapeyre |
| 3,750,293 A | | 8/1973 | Forrest |
| 3,790,276 A | * | 2/1974 | Cook et al. |
| 3,829,222 A | | 8/1974 | Aslund |
| 3,871,758 A | | 3/1975 | Lemelson |
| 3,873,210 A | | 3/1975 | Konopka |
| 3,895,366 A | | 7/1975 | Morris |
| 3,915,575 A | | 10/1975 | Sick |
| 3,932,039 A | | 1/1976 | Frey |
| 4,005,261 A | | 1/1977 | Sato et al. |
| 4,136,387 A | | 1/1979 | Sullivan et al. |
| 4,137,566 A | | 1/1979 | Haas et al. |
| 4,146,230 A | | 3/1979 | Foster |
| 4,155,555 A | | 5/1979 | Fink |
| 4,227,807 A | | 10/1980 | Pond et al. |
| 4,251,077 A | | 2/1981 | Pelz et al. |
| 4,254,956 A | | 3/1981 | Rusnak |
| 4,304,406 A | | 12/1981 | Cromarty |
| 4,306,723 A | | 12/1981 | Rusnak |
| 4,337,049 A | | 6/1982 | Connelly |
| 4,341,384 A | | 7/1982 | Thackrey |
| 4,434,654 A | | 3/1984 | Hulsing, II et al. |
| 4,488,173 A | | 12/1984 | Di Matteo et al. |
| 4,577,868 A | | 3/1986 | Kiyonaga |
| 4,583,852 A | * | 4/1986 | Cassidy et al. |
| 4,583,862 A | | 4/1986 | Ferrar et al. |
| 4,652,917 A | | 3/1987 | Miller |
| 4,732,472 A | | 3/1988 | König et al. |
| 4,891,748 A | | 1/1990 | Mann |
| 4,910,410 A | | 3/1990 | Workman |
| 5,009,501 A | * | 4/1991 | Fenner et al. |
| 5,187,540 A | | 2/1993 | Morrison |
| 5,233,544 A | | 8/1993 | Kobayashi |
| 5,257,084 A | | 10/1993 | Marsh |
| 5,299,253 A | | 3/1994 | Wessels |
| 5,319,577 A | | 6/1994 | Lee |
| 5,353,358 A | | 10/1994 | Baird et al. |
| 5,358,251 A | | 10/1994 | Ashton |
| 5,453,686 A | | 9/1995 | Anderson |
| 5,486,001 A | | 1/1996 | Baker |
| 5,489,983 A | * | 2/1996 | McClenahan |
| 5,566,251 A | | 10/1996 | Hanna et al. |
| 5,719,386 A | | 2/1998 | Hsieh et al. |
| 5,729,471 A | | 3/1998 | Jain et al. |
| 5,828,447 A | | 10/1998 | Duchon et al. |
| 5,850,352 A | | 12/1998 | Moezzi et al. |
| 5,936,723 A | | 8/1999 | Schmidt et al. |

FOREIGN PATENT DOCUMENTS

| | | |
|---|---|---|
| FR | 2 723 208 | 2/1996 |
| GB | 2 082 867 A | 3/1982 |
| GB | 2 082 867 A | 10/1982 |
| JP | 405118868 A | 5/1993 |
| SU | 000800628 A | 1/1981 |

OTHER PUBLICATIONS

International Search Report from International Patent Application PCT/US00/31184.

International Search Report from International Patent Application PCT/US00/31055.

International Search Report from Int. Application No. PCT/US99/11449, mailed Apr. 2, 2000.

Laser Focus World, Apr. 1989, V. 25, N. 4, p. 139–48, "Phase Conjugating Device Detects Alignment Errors" By J. B. Lisson.

Fire Technology, May 1988, v. 24, N. 2, p. 100–109, "Oblique Orientation Augments UV Detector Coverage Area" By Arturo G. Sancholuz.

* cited by examiner

ORIENTATION DEPENDENT RADIATION SOURCE

CROSS REFERENCE TO RELATED APPLICATION

This application is a continuation-in-part of U.S. application Ser. No. 08/698,115 filed Aug. 15, 1996, now U.S. Pat. No. 5,936,723 and U.S. application Ser. No. 08/698,357, filed Aug. 15, 1996 now U.S. Pat. No. 5,936,722. Both of these applications are incorporated herein by reference.

FIELD OF THE INVENTION

The present invention relates to radiation sources, and more particularly to an orientation dependent radiation source, the orientation of which may be determined about one or more axes of rotation.

BACKGROUND OF THE INVENTION

Conventional radiation sources include "primary" sources, such as acoustic or electromagnetic wave transmitters, as well as "secondary" sources of radiation, such as reflectors which reflect radiation based on some incident radiation. While both conventional primary and secondary radiation sources are employed in a wide variety of applications, many conventional sources are not constructed so as to facilitate a determination of an orientation of the source, or an orientation of an object to which the source is coupled, with respect to some reference position.

In particular, conventional primary orientation dependent sources which direct radiation to a particular observation area and facilitate the determination of the orientation of the source from the observation area are not known. Moreover, conventional orientation detection systems, which employ secondary radiation sources such as reflectors, are mostly limited to the determination of orientation in a single dimension, or about one axis of rotation. Many conventional orientation detection systems, including those systems which are constructed so as to facilitate a determination of orientation in more than one dimension, typically employ complex image processing techniques and equipment which process signals that are received from a group of radiation sensors arranged in a line, or dispersed throughout an observation area. Such radiation sensing configurations are often expensive and may require large observation areas for deployment, rendering such orientation detection systems impractical for many applications.

SUMMARY OF THE INVENTION

The present invention is directed to methods and apparatus for producing orientation dependent radiation, and orientation detection systems employing such methods and apparatus.

In one embodiment, an orientation dependent radiation source according to the invention includes a first mask to substantially block radiation, wherein the first mask defines an observation surface and includes a first plurality of openings through which radiation is capable of passing. The orientation dependent radiation source also includes a second mask coupled to the first mask. The second mask includes a second plurality of openings offset relative to the first plurality of openings such that radiation passing through at least the first plurality of openings produces an orientation dependent radiation pattern on the observation surface. The orientation dependent radiation pattern has at least one detectable centroids that varies in position across the observation surface based on a rotation angle of the first and second masks about at least one axis of rotation.

In another embodiment, an orientation detection system according to the invention includes one or more orientation dependent radiation sources to direct orientation dependent radiation to an observation area. Each orientation dependent radiation source is constructed and arranged so as to facilitate a determination, from the observation area, of a rotation angle of the source about at least one axis of rotation based on the orientation dependent radiation. The system also includes one or more radiation sensors located within the observation area to detect the orientation dependent radiation. In one embodiment of the orientation detection system according to the invention, each orientation dependent radiation source includes a primary radiation source.

A method for producing an orientation dependent radiation pattern on an observation surface, according to one embodiment of the invention, includes a step of varying a surface area of a radiation source exposed through the observation surface, in response to a rotation of the observation surface about at least one axis of rotation, to produce at least one detectable centroids having a position that varies across the observation surface corresponding to the rotation.

Other advantages, novel features and objects of the invention will become apparent from the following detailed description of the invention when considered in conjunction with the accompanying drawings.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing, wherein.

DETAILED DESCRIPTION

The present invention is directed to methods and apparatus for producing orientation dependent radiation, and orientation detection systems employing such methods and apparatus.

An orientation dependent radiation source according to the invention produces orientation dependent radiation and directs the orientation dependent radiation to an observation area to facilitate a determination of the orientation of the source from the observation area. In particular, an orientation dependent radiation source according to one embodiment of the invention produces a radiation pattern having at least one detectable centroids that varies in position across an observation surface of the source, as observed from the observation area, based on a rotation angle of the source about one or more axes of rotation.

According to various embodiments of the invention, the orientation dependent radiation source may include one or more primary radiation sources such as acoustic or electromagnetic wave transmitters, or secondary sources such as reflectors. In one embodiment, one or more orientation dependent radiation sources may be employed in a system which includes one or more radiation sensors located in the observation area to detect the orientation dependent radiation from the one or more orientation dependent radiation sources. Additionally, the orientation dependent radiation produced by an orientation dependent radiation source according to one embodiment of the invention may be visibly observable, allowing an observer to qualitatively determine the orientation of the source from the observation area.

Figure 1A:
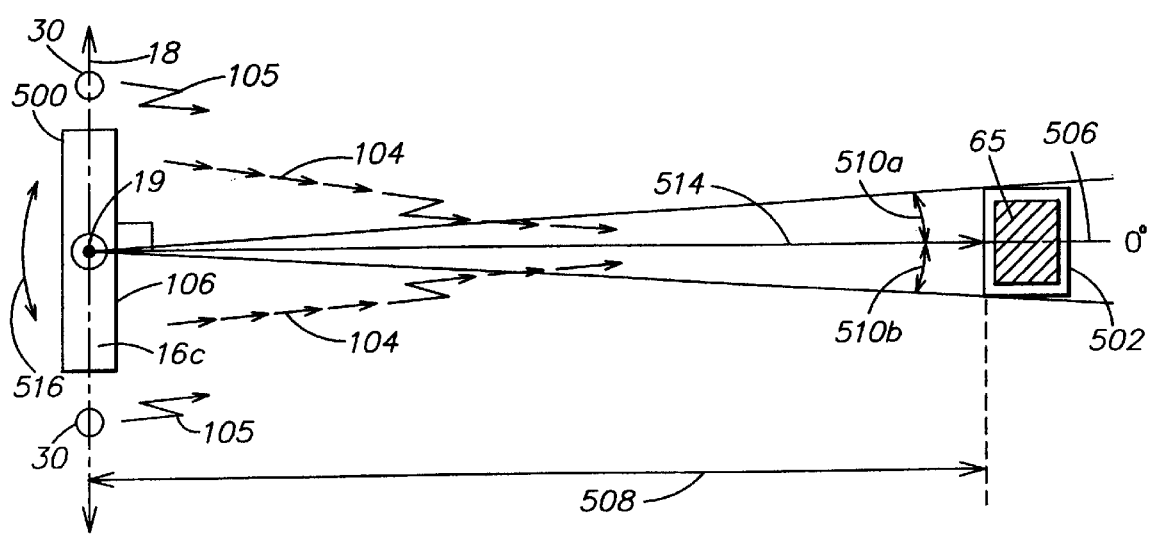
FIGS. 1A, 1B, and 1C are diagrams showing top views of an orientation detection system according to one embodiment of the invention.

FIG. 1A is a diagram showing a top view of an orientation detection system according to one embodiment of the invention. While structurally different, the orientation detection system of FIG. 1A functions similarly to a system described in U.S. application Ser. No. 08/698,357, herein incorporated by reference. In the system of FIG. 1A, an orientation dependent radiation source 500 directs orientation dependent radiation 104 to an observation area 502. The orientation dependent radiation source 500 is constructed and arranged so as to facilitate a determination of a rotation angle 516 of the source 500 about at least one axis of rotation, based on the orientation dependent radiation 104 as observed and/or detected from the observation area 502. The system of FIG. 1A also includes at least one radiation sensor 65 located within the observation area 502 to detect the orientation dependent radiation 104.

FIG. 1A shows two orthogonal axes 18 and 19 passing through the orientation dependent radiation source 500. As viewed from the observation area 502, the axis 19 passes through the orientation dependent radiation source 500 "vertically" into the plane of the figure, and is indicated in FIG. 1A by an encircled dot on atop surface 16c of the source 500. Similarly viewed, the axis 18 passes through the orientation dependent radiation source 500 "horizontally," in the plane of the figure. In FIG. 1A, the rotation angle 516 is indicated for purposes of illustration about the vertical axis 19, although in other embodiments the orientation dependent source may be rotated about one or both of the horizontal axis 18 and the vertical axis 19, as discussed further below.

The orientation dependent radiation source 500 shown in FIG. 1A has an observation surface 106 from which the orientation dependent radiation 104 is directed to the observation area 502. The observation area 502 is located at a radius 508 from the vertical axis 19. The orientation dependent radiation source 500 has preference position 506 about the vertical axis 19, indicated in FIG. 1A as 0°. The observation area 502 is located at the radius 508 along a reference position normal 514 extending from the observation surface 106 when the orientation dependent source 500 is in the reference position 506.

FIG. 1A shows that the observation area 502 spans an observation angle 510, relative to the reference position 506, about the vertical axis 19. In FIG. 1A, two observation angles 510a and 510b are indicated about the reference position 506, angle 510b indicating a clockwise rotation about the vertical axis 19 and angle 510a indicating an equivalent counterclockwise rotation about the vertical axis 19. The observation angle 510a or 510b is in a plane orthogonal to the vertical axis 19, which in the example of FIG. 1A is given by the plane of the figure, and includes the reference position normal 514.

FIG. 1A also shows that an orientation detection system according to one embodiment of the invention may include one or more orientation independent radiation sources 30 to direct orientation independent radiation 105 to the observation area 502. While FIG. 1A shows two orientation independent radiation sources 30 separate from the orientation dependent radiation source 500, in other embodiments one or more orientation independent radiation sources 30 may be coupled to the orientation dependent radiation source 500, as discussed further below.

In one embodiment, the one or more orientation independent radiation sources 30 direct the orientation independent radiation 105 to the observation area 502 substantially independently of the rotation angle 516 of the orientation dependent source 500. In other embodiments, while the orientation independent radiation 105 may be a function of the rotation angle 516 to some extent, it is so to a substantially lesser extent than the orientation dependent radiation 104.

In embodiments including one or more orientation independent sources 30, the orientation independent radiation 105 may serve as a reference for the orientation dependent radiation 104, as discussed further below in connection with FIGS. 5A–C, and as described in U.S. application Ser. No. 08/698,357, referenced above. The both the orientation dependent radiation 104 and the orientation independent radiation 105.

Figure 1B:
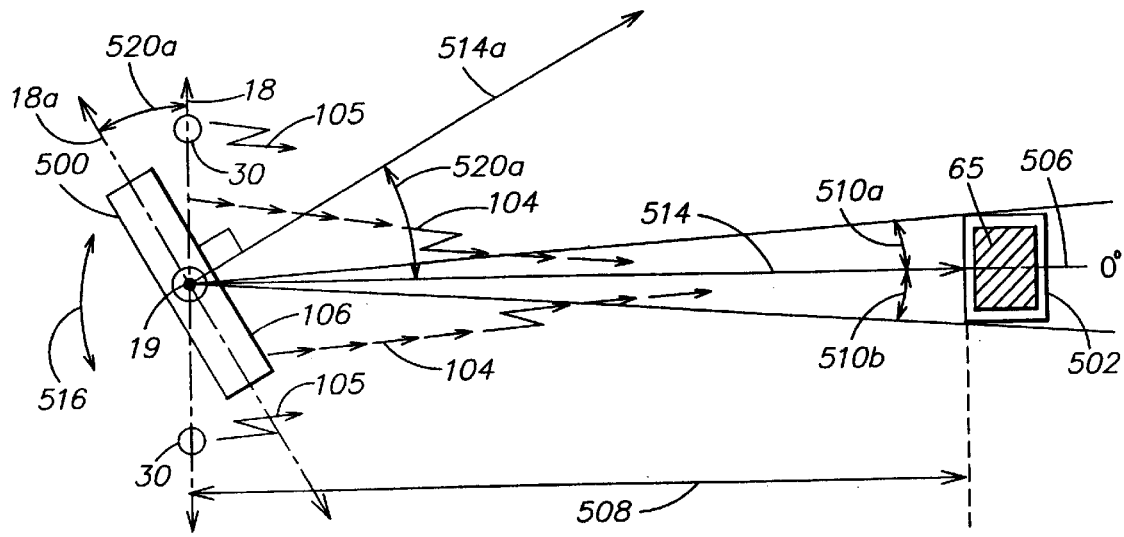

FIGS. 1B and 1 are diagrams similar to that of FIG. 1A, illustrating rotation angles 520*a* and 520*b*, respectively, of the orientation dependent radiation source 500 about the vertical axis 19. The rotation angles 520*a* and 520*b* represent maximum rotation angles, counterclockwise and clockwise, respectively, of the orientation dependent radiation source 500 about the vertical axis 19. At rotation angles up to and including angles 520*a* and 520*b*, the source 500 is capable of producing orientation dependent radiation 104 which may be observed or detected from the observation area 502. The actual rotational angles 520*a* and 520*b* shown in FIGS. 1B and 1C are for purposes of illustration only, and are not intended to be limiting. Examples of maximum rotation angles according to various embodiments of the invention at which the source 500 is capable of directing orientation dependent radiation 104 to the observation area 502 include, but are not limited to, angles in a range of from 45° to 90°.

Figure 1C:
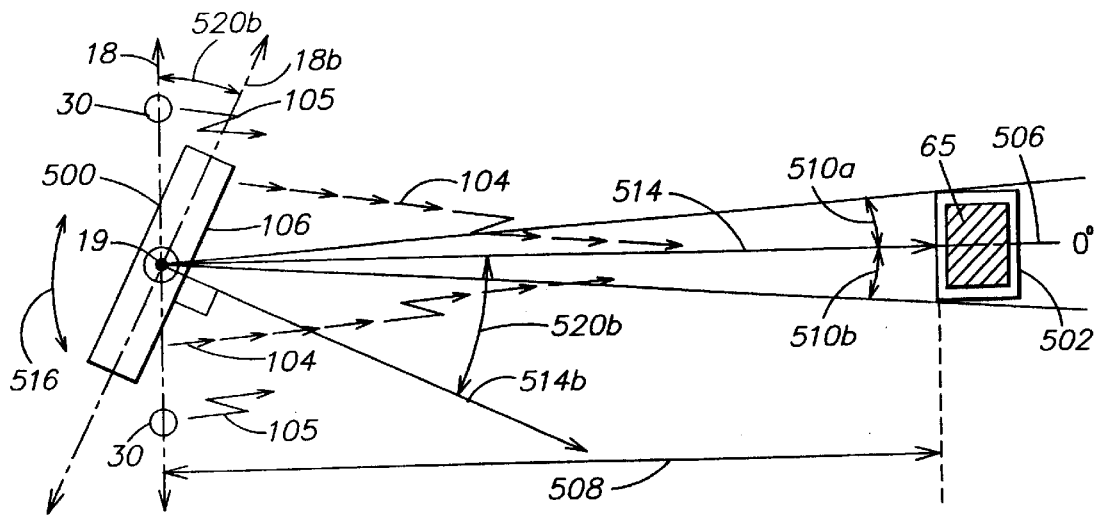

It should be appreciated that the physical movement of the source 500 is not necessarily limited by the maximum rotation angles 520*a* and 520*b* shown in FIGS. 1B and 1C, and that according to some embodiments, the source 500 may freely rotate one or more times clockwise and counterclockwise about one or more axis of rotation. The rotation angles 520*a* and 520*b* are respectively indicated in FIGS. 1B and 1C between the horizontal axis 18 of the orientation dependent radiation source 500 when the source 500 is in the reference position 506 and the rotated horizontal axes 18*a* and 18*b*. In FIGS. 1B and 1C, the rotation angles 520*a* and 520*b* are also indicated between the reference position normal 514 and rotated normals 514*a* and 514*b*, respectively, to the observation surface 106.

According to one embodiment of the invention, the observation angle 510*a* or 510*b* which is spanned by the observation area 502 is substantially less than the maximum rotation angle 520*a* and 520*b* of the orientation dependent radiation source 500. In this embodiment, notwithstanding the maximum rotation angle 520*a* or 520*b* being greater than the observation angle 510*a* or 510*b*, the orientation dependent radiation source 500 is capable of directing the orientation dependent radiation 104 to the observation area 502 at a plurality of first rotation angles 516 about the vertical axis 19 up to the maximum rotation angle 520*a* or 520*b*. In this manner, the observation area 502, and hence the radiation sensor 65 located within the observation area 502, may occupy a much smaller area than would be required, for example, to observe a conventional primary or secondary source emitting radiation in a direction substantially normal to an observation surface, at any angle of rotation.

As discussed above, while FIGS. 1A, 1B, and 1C indicate that the orientation independent radiation sources 30 are stationary with respect to the rotatable orientation dependent radiation source 500, in other embodiments one or more orientation independent radiation sources 30 may be coupled to the orientation dependent radiation source 500, and rotate with the orientation dependent radiation source 500. Notwithstanding the rotation, the orientation independent radiation sources 30 direct orientation independent radiation 105 to the observation area 502 essentially independently of the rotation angle 516.

While FIGS. 1A, 1B, and 1C each show a top view of an orientation detection system according to one embodiment of the invention, according to another embodiment these same figures may be used to describe a side view of the orientation detection system, in which the axes 18 and 19 are exchanged. In this manner, it may be appreciated that the orientation dependent radiation source 500 may be rotated similarly about the horizontal axis 18, and hence facilitate a determination of orientation in two dimensions, or about two axes of rotation. Correspondingly, the observation area 502 in such a "two-dimensional" embodiment would span a second observation angle about the horizontal axis 18 relative to the reference position 506, wherein the second observation angle is in a plane orthogonal to the horizontal axis 18 and includes the reference position normal 514. As in FIGS. 1B and 1C, the orientation dependent radiation source 500 may have second maximum rotation angles clockwise and counterclockwise about the horizontal axis 18, and the second observation angle of the observation area would be substantially less than the second maximum rotation angles about the horizontal axis 18. The orientation dependent radiation source 500 would nonetheless be capable of directing the orientation dependent radiation 104 to the observation area 502 at a plurality of rotation angles about the horizontal axis 18 up to the second maximum rotation angles.

In such a "two dimensional" embodiment of an orientation detection system according to the invention, the system may include one or more additional orientation independent radiation sources 30 positioned along the vertical axis 19 in a manner similar to that shown for the orientation independent sources 30 positioned along the horizontal axis 18 in FIGS. 1A–C. Any additional orientation independent radiation sources 30 positioned along the vertical axis 19 may or may not be coupled to the orientation dependent radiation source 500.

Figure 1D:
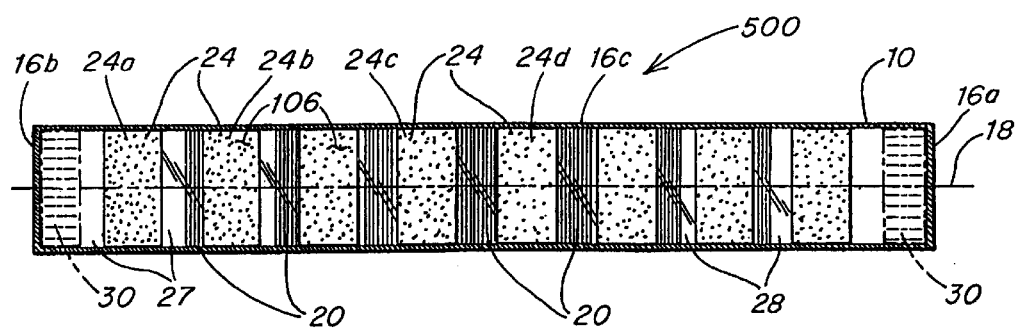
FIG. 1D is a front view of an orientation dependent radiation source according to one embodiment of the invention.
Figure 2:
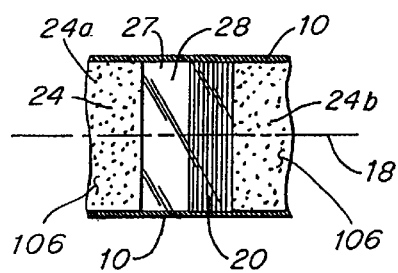
FIG. 2 is an enlarged front view of a portion of the orientation dependent radiation source shown in FIG. 1D.
Figure 3:
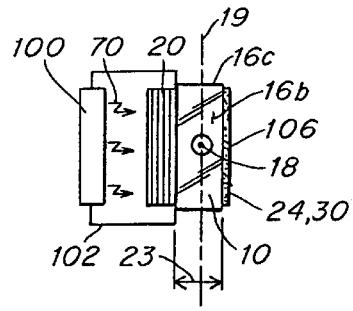
FIG. 3 is a side view of the orientation dependent radiation source shown in FIG. 1D according to one embodiment of the invention.
Figure 4:
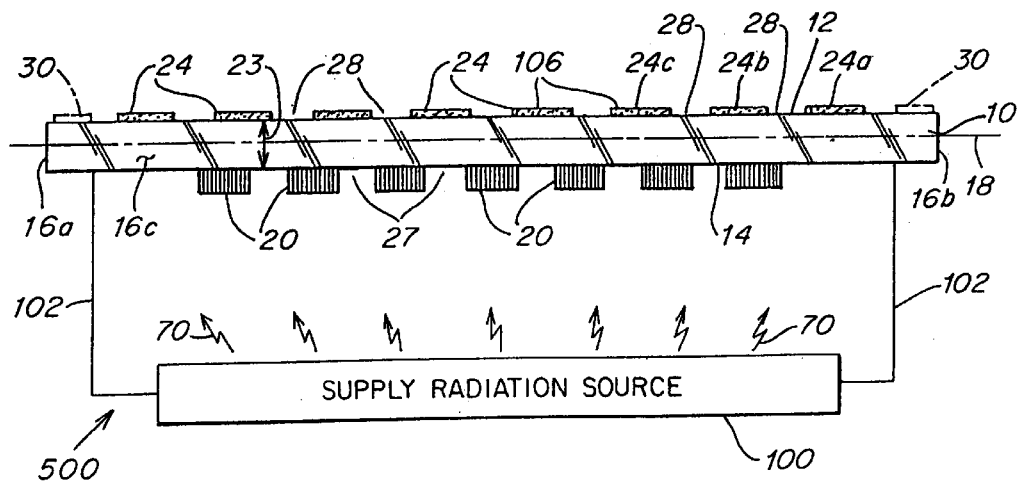
FIG. 4 is a top view of the orientation dependent radiation source shown in FIG. 1D.

FIGS. 1D, 2, 3, and 4 show various views of the orientation dependent radiation source 500 according to one embodiment of the invention. FIG. 1D is a front view of the orientation dependent radiation source 500, looking onto the observation surface 106, in which the axis 18 is indicated horizontally. FIG. 2 is an enlarged front view of a portion of the orientation dependent radiation source 500 shown in FIG. 1D. FIG. 3 is a side view of the orientation dependent source 500, looking onto a plane defined by an end surface 16*b*. FIG. 4 is a top view of the orientation dependent source 500 similar to that of FIGS. 1A–C, looking onto a plane defined by a top surface 16*c*.

For purposes of the following discussion, "source radiation" refers to radiation provided by one or more primary "supply" sources, such as acoustic or electromagnetic wave transmitters, as well as radiation provided by one or more secondary "supply" sources of radiation, such as reflectors which reflect radiation based on some incident radiation. Such source radiation is generally indicated in the drawings by reference character 70. In contrast, "orientation dependent radiation" refers to radiation produced by the orientation dependent radiation source 500 and emitted from the observation surface 106, and is generally indicated in the drawings by reference character 104, as shown, for example, in FIGS. 1A–1C.

FIGS. 1D, 2, 3, and 4 show that the orientation dependent radiation source 500 according to one embodiment of the invention includes a first mask 24 to substantially block source radiation. In the figures, the first mask 24 is generally indicated as areas filled with dots. Source radiation 70 is shown specifically in the views of FIGS. 3 and 4, and as discussed above may be either acoustic or electromagnetic in nature, and may be in a variety of wavelength (or frequency) ranges of interest, for example, ultrasound, infrared, visible, ultraviolet, x-ray, etc.

The first mask 24 may be made of a variety of materials that at least partially absorb, or do not fully transmit, a particular wavelength range or ranges of source radiation 70. Examples of first ask materials suitable for purposes of the invention include, but are not limited to, any number of acoustic and/or electromagnetic absorbers having a variety of physical sizes and forms. In particular, for embodiments of the invention in which the orientation dependent source 500 may be fabricated using conventional semiconductor fabrication techniques, first mask materials suitable for purposes of the invention may include a variety of thin films which at least partially absorb, or do not fully transmit, the source radiation 70.

As shown in the front views of FIGS. 1D and 2, the first mask 24 defines the observation surface 106 of the orientation dependent radiation source 500. The first mask 24 includes a number of openings 28 through which the source radiation 70 is capable of passing. In particular, the first mask 24 may include a number of mask portions 24a, 24b, 24c etc., separated by the openings 28 and coupled together via a support structure 10. As shown in FIGS. 1D and 2, the support structure 10 may be a frame-like structure around a perimeter of the orientation dependent radiation source 500, to which the portions of the first mask 24 are coupled. Alternatively, the support structure 10 may be constructed and arranged as a system of beams, or as a trellis, to which the portions of the first mask 24 may be affixed in a "fence-like" manner.

The support structure 10, as shown in FIGS. 1D, 2, 3, and 4, is preferably constructed and arranged so as not to obstruct the source radiation 70 passing through the openings 28 of the first mask 24. In particular, while FIGS. 1D and 2 show the support structure 10 as a frame-like structure, as discussed above, in one embodiment the support structure 10 may be a solid substrate which is substantially transmissive of the source radiation 70. For example, a transparent substrate support structure 10 may be formed from a solid material that allows substantially undistorted transmission of the source radiation 70 through the substrate support structure 10. In this manner, the first mask 24 may include a continuously connected piece of mask material, formed on the substrate support structure 10, having a number of openings 28 formed through the mask material.

FIGS. 1D, 2, 3, and 4 also show that the orientation dependent radiation source 500 according to one embodiment of the invention includes a second mask 20, generally indicated in the figures by areas shaded with vertical lines. The second mask 20 may be coupled to the first mask 24, for example, via the support structure 10. Like the first mask 24, the second mask 20 may be made of a variety of materials, and includes a number of openings 27. The openings 27 are offset relative to the openings 28 of the first mask 24 such that the source radiation 70 passing through the openings 28 produces the orientation dependent radiation 104 shown in FIGS. 1A–C, and in particular, produces an orientation dependent radiation pattern on the observation surface 106.

As discussed further below in connection with FIGS. 5A–C, the orientation dependent radiation pattern produced on the observation surface 106 of the orientation dependent radiation source 500 by virtue of the relatively off set openings 27 and 28, according to one embodiment of the invention, includes one or more detectable centroids of radiation. The detectable centroids vary in position across the observation surface 106 based on the rotation angle 516 of the first and second masks 24 and 20, respectively, about at least the vertical axis 19.

As illustrated particularly in FIGS. 3 and 4, the second mask 20 is separated from the first mask 24 by a distance 23, which, as shown in the figures, may correspond to a thickness of the support structure 10. The area corresponding to the distance 23 between the first mask 24 and the second mask 20 may be occupied by, for example, a gas, liquid, or solid which is substantially transmissive of the source radiation 70. In particular, the support structure 10 may be a solid substrate which is transmissive of the source radiation 70, as discussed above. FIGS. 3 and 4 show that the first mask 24 may be coupled to a front surface 12 of a transparent substrate support structure 10, while the second mask 20 may be coupled to a back surface 14 of the transparent substrate support structure 10. In the one embodiment, whether the support structure 10 be frame like, trellis-like, or a transparent substrate, the second mask 20 may be arranged substantially parallel to the first mask 24, although other embodiments may not require this.

Figure 3A:
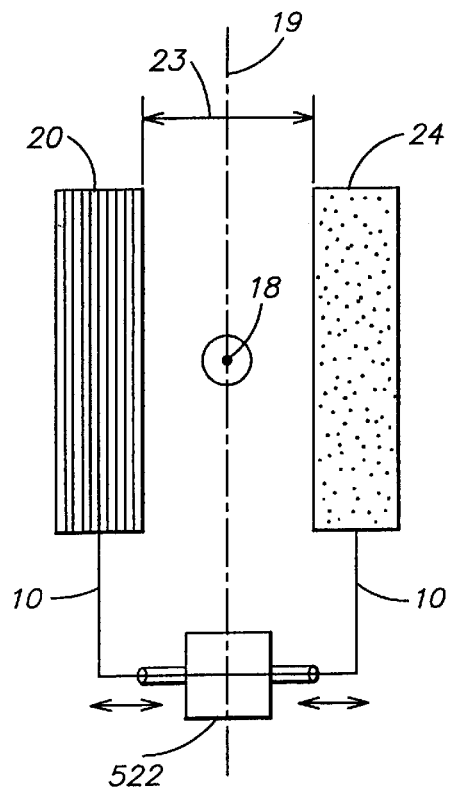
FIGS. 3A–F are side views of the orientation dependent radiation source shown in FIG. 1D, according to other embodiments of the invention.
Figure 3B:
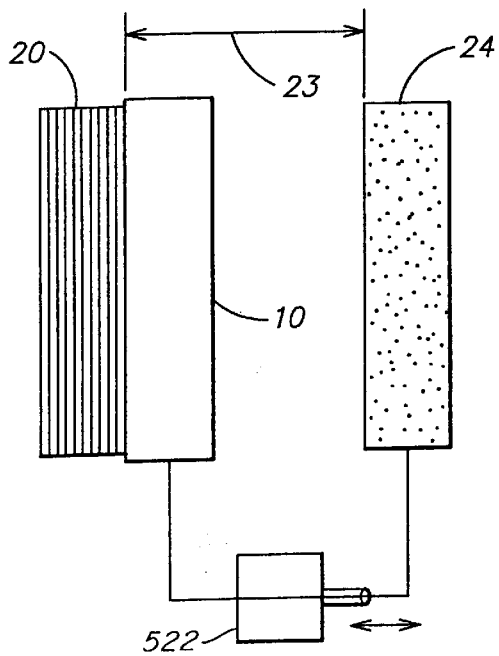

Additionally, in one embodiment of the invention the distance 23 separating the first and second masks may be variable. For example, FIGS. 3A and 3B are side views similar to FIG. 3 which show that one or both of the first mask 24 and the second mask 20 may be coupled to a translational controller 522. The translational controller 522 may serve as the support structure 10 itself, as shown in FIG. 3A, or may be coupled to the support structure 10, as shown in FIG. 3B. The translational controller 522 may be operated to vary the distance 23 between the first and second masks.

Figure 3C:
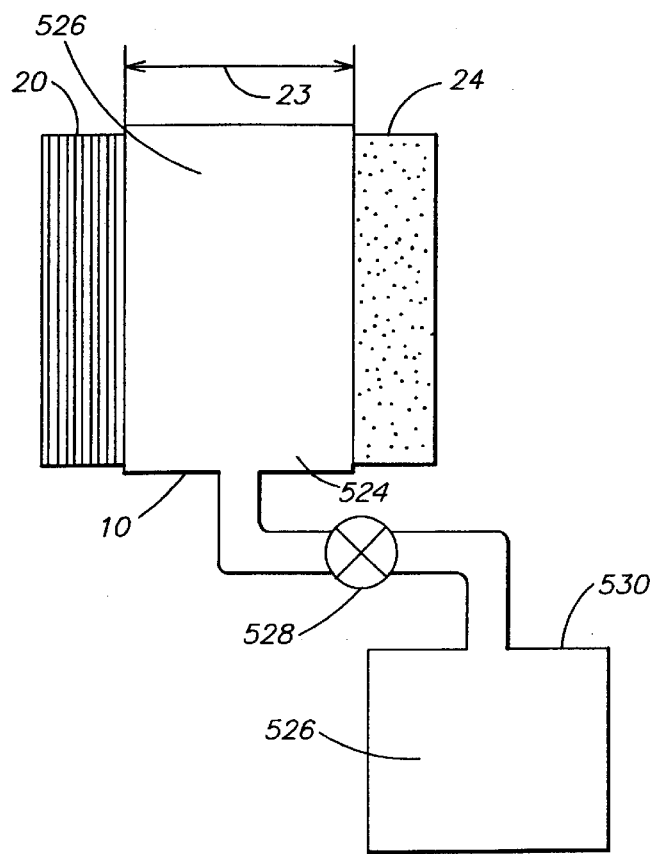

Alternatively, in another embodiment as shown in FIG. 3C, the support structure 10 may include an expandable and retractable cavity 524 containing a fluid or gas 526 substantially transmissive of the source radiation. In this embodiment, a volume of the fluid or gas 526 in the cavity 524 may be controlled by a controllable valve 528 which couples the cavity 524 to a fluid or gas source, such as, for example, reservoir 530. The controllable valve 528 is operated to vary the volume of fluid or gas 526 in the cavity 524 such that the distance 23 between the first and second masks is variable.

Figure 3D:
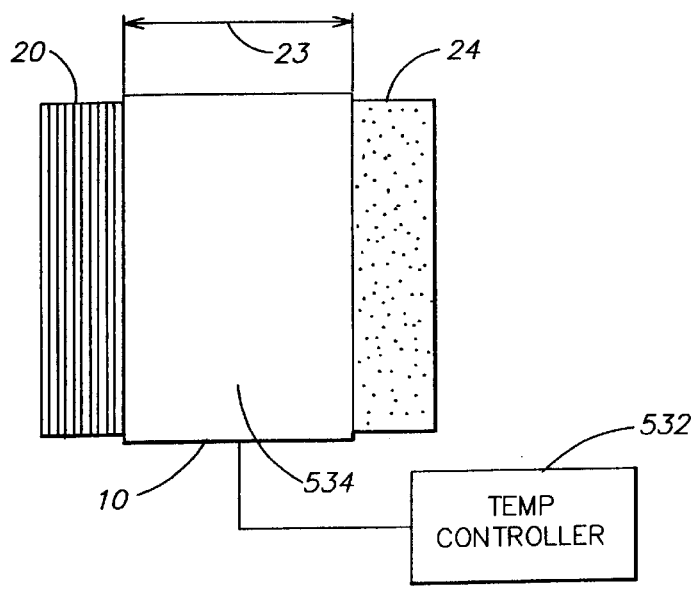

In yet another embodiment as shown in FIG. 3D, in which the support structure 10 is formed as a substrate, the substrate 10 may include a temperature sensitive material 534 such that the distance 23 varies with a substrate temperature. In this embodiment, the temperature of the substrate may be controlled by a temperature controller 532. The temperature controller 532, in turn, controls the distance 23 based on the expansion or contraction of the temperature sensitive material 534. One example of a temperature sensitive material 534 suitable for purposes of the invention includes, but is not limited to, a temperature sensitive polymer.

As discussed above in connection with FIGS. 1A–C, the orientation dependent radiation source 500 may also include one or more orientation independent radiation sources 30, which are shown in FIGS. 1D and 4 as coupled to the support structure 10 to produce an orientation independent radiation pattern on the observation surface 106. In the embodiment shown in FIGS. 1D and 4, one or more orientation independent radiation sources 30 are preferably positioned adjacent opposing end surfaces 16a and 16b of the support structure 10. The orientation independent radiation sources 30 may be primary radiation sources, or alternatively, may be secondary radiation sources such as reflectors. For example, as shown in FIGS. 1D and 4, the orientation independent sources 30 may be reflective patches having a rectangular shape.

Figure 3E:
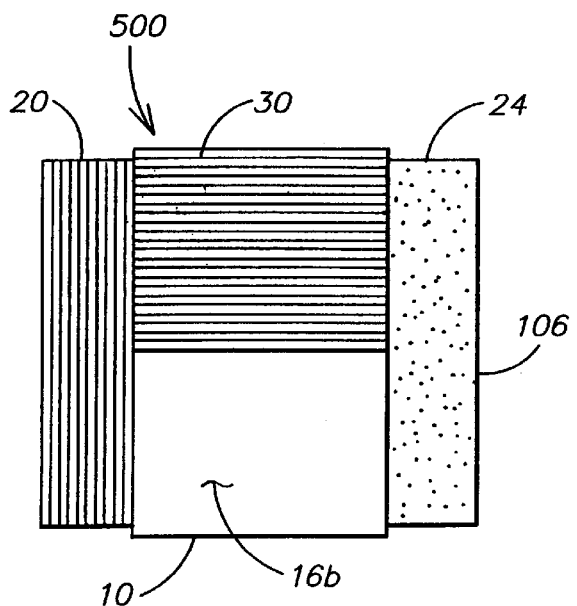
Figure 3F:
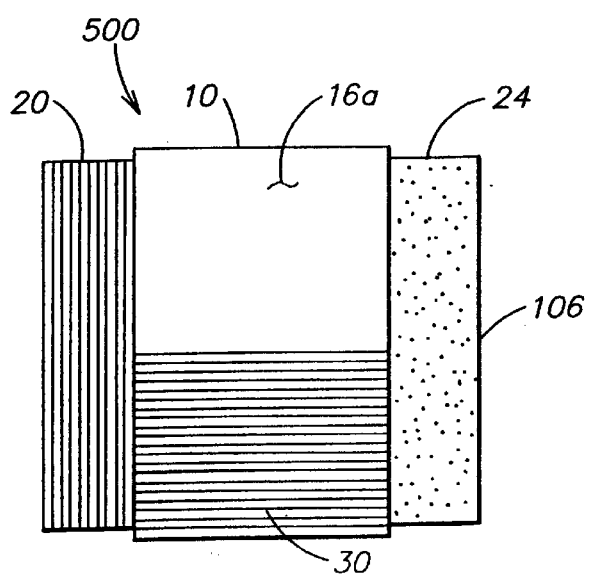

Furthermore, one or more orientation independent sources 30 may be placed on at least one of the end surfaces 16a and 16b of the orientation dependent source 500 according to one embodiment of the invention. For example, as shown in FIGS. 3E and 3F, which are side views similar to FIG. 3, at least a portion of one of end surfaces 16b and 16a may include one or more orientation independent radiation sources 30. As shown in FIGS. 3E and 3F, each end surface 16a and 16b may be divided into one or more regions, and different regions on opposing end surfaces may include one or more orientation independent sources 30. The embodiments illustrated in FIGS. 3E and 3F, and similar embodiments having orientation independent sources on lateral surfaces, are useful in applications that require information in connection with a count or a number of fill rotations of the orientation dependent radiation source 500, or alternatively, a rotation speed of the orientation dependent radiation source 500.

FIGS. 3 and 4 show that the orientation dependent radiation source 500 may also include a supply radiation source 100 to emit source radiation 70, wherein the second mask 20 is disposed between the supply source 100 and the first mask 24 to substantially block the source radiation 70 except in the areas of the openings 27. The supply source 100 may be coupled to the support structure 10 via a variety of coupling apparatus 102, which may be selected based at least in part on the type, size and shape of the supply source 100.

For example, the supply source 100 may be a primary source of radiation, such as a point source that radiates the source radiation 70 multidirectionally. Other examples of a primary supply source 100 suitable for purposes of the invention include, but are not limited to, incandescent lamps, light-emitting diodes, ultrasound transducers, antennas, and the like. According to various embodiments of the invention as discussed further below, an amount of radiation emitted by a primary or secondary supply source 100 may vary along one or more directions parallel to the horizontal axis 18 and the vertical axis 19. Additionally, according to some embodiments, the amount of radiation emitted by the supply source 100 may vary radially from a point on the supply source 100, for example, a geometric center of the supply source, which may in some cases substantially correspond to a geometric center of the observation surface 106.

In another embodiment, the supply radiation source 100 shown in FIGS. 3 and 4 may be a secondary radiation source, such as a reflector. In particular, a reflector serving as the supply source 100 may be a retro-reflector, which has the property of returning incident radiation in a direction parallel to the incident radiation. In embodiments of the orientation dependent radiation source 500 shown in FIGS. 1D, 2, 3, and 4 employing a reflector as the supply source 100, incident radiation is directed towards the observation surface 106 by a primary radiation source, as discussed below in connection with FIG. 7. In such embodiments, the radiation incident to the observation surface 106 passes through openings 28 and 27, respectively, is incident upon the reflector serving as the supply source 100, is reflected therefrom as radiation 70, and passes through openings 27 and 28, respectively, to produce an orientation dependent radiation pattern on the observation surface 106, as discussed further below in connection with FIGS. 5A–C.

The orientation dependent radiation source 500 shown in FIGS. 1D, 2, 3, and 4 functions as follows. With reference again to FIG. 1D, which is a front view of the orientation dependent source 500 looking on to the observation surface 106, the openings 28 of the first mask 24 are offset relative to the openings 27 of the second mask 20, which is located behind mask 24 in FIG. 1D. With reference now to FIGS. 5A and 5B, depending on the rotation angle 516 of the orientation dependent source 500 about the vertical axis 19, shown in FIGS. 5A and 5B as a z-axis orthogonal to the horizontal axis 18, only specific surface areas of the supply radiation source 100 (not shown in the view of FIGS. 5A–B) are exposed through the openings 27 and 28. This exposure of only specific surface areas of the supply source 100 produces an orientation dependent radiation pattern on the observation surface 106 which includes one or more centroids 32, or maximum intensity radiation spots, as shown in FIGS. 5A and 5B. As the orientation dependent source 500 is rotated about the vertical axis 19, the surface areas of the supply source 100 which are exposed through the offset openings 27 and 28 change, and as a result, the one or more centroids 32 vary in position across the observation surface 106 based on the rotation angle 516. Accordingly, by observing the position of the one or more centroids 32 along the longitudinal axis 18, the rotation angle 516 of the source 500 about the vertical axis 19 may be determined.

In one embodiment, the orientation dependent radiation source 500 is constructed and arranged such that at least one centroids 32 appears approximately at a geometric center of the source 500 when the rotation angle 516 is 0° and the orientation dependent radiation 104 emitted by the source 500 is viewed from a position normal to the observation surface 106. For example, if the source 500 is in the reference position 506, as shown in FIG. 1A, and the observation surface 106 is viewed from the observation area 502, at least one centroids would be centered on the observation surface 106. FIG. 5A illustrates the movement of the position 34a of the centroids 32a on the observation surface 106 as the source 500 is rotated counter-clockwise by a rotation angle 516a about the vertical axis 19, similar to the rotation shown in FIG. 1B. In FIG. 5A, two orientation independent radiation sources 30 can be seen to produce individual radiation patterns at the opposing ends 16a and 16b of the orientation dependent source 500. These orientation independent radiation patterns may serve as references for the position 34a of the centroids 32a. In a similar manner, FIG. 5B illustrates the movement of the position 34b of the centroids 32b along the horizontal axis 18 of the observation surface 106 as the orientation dependent source 500 is rotated clockwise by a rotation angle 516b about the vertical axis 19, similar to the rotation shown in FIG. 1C.

Figure 5A:
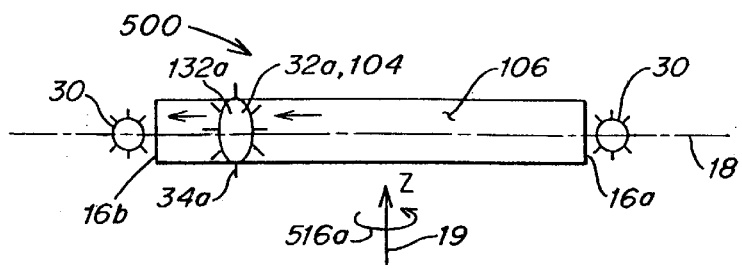
FIGS. 5A and 5B are front views of the orientation dependent radiation source of FIG. 1D, illustrating orientation dependent radiation patterns produced in response to a rotation about an axis.
Figure 5B:
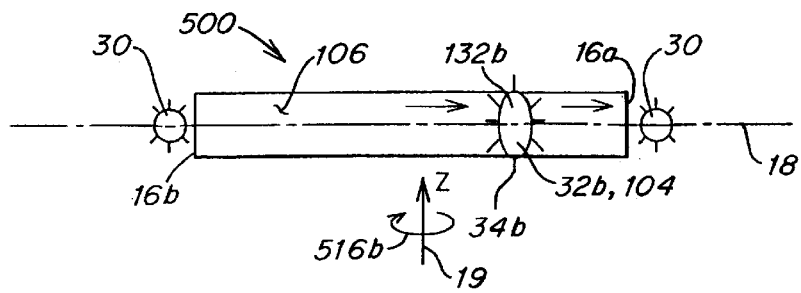
Figure 5C:
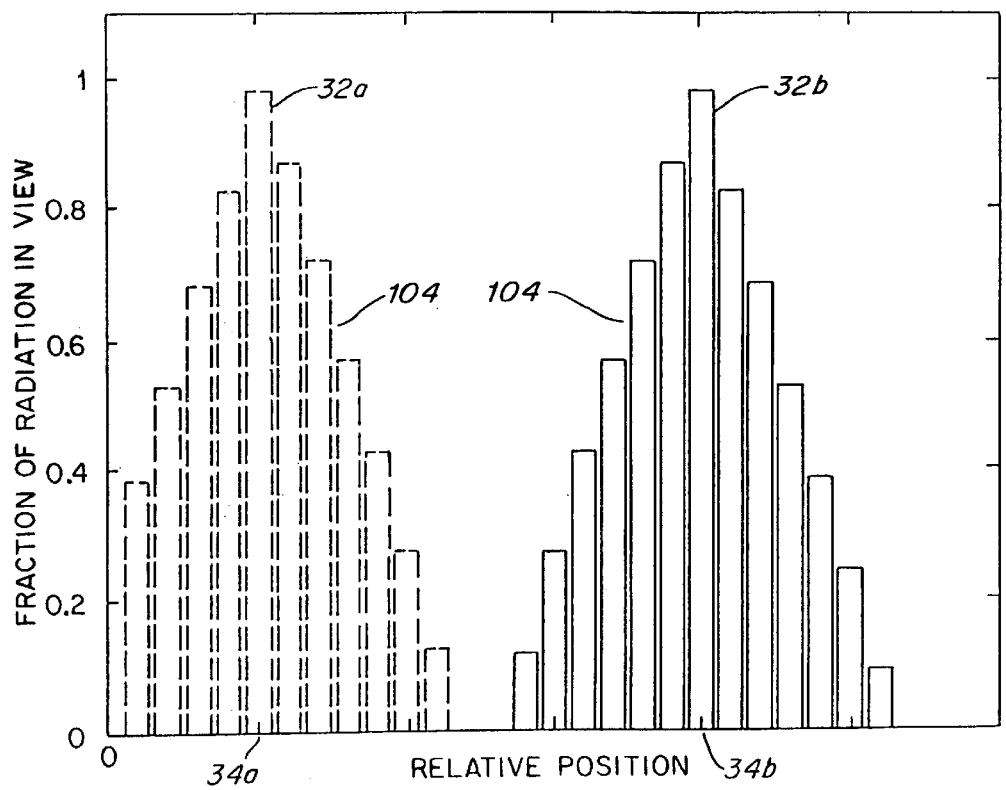
FIG. 5C is a graphical representation of the radiation patterns shown in FIGS. 5A and 5B as a function of rotation about the axis.

FIG. 5C shows graphical representations of the orientation dependent radiation 104 in view from the observation area 502, including the centroids 32a and 32b formed by the surface areas of the supply radiation source 100 that are exposed at the particular rotation angles 516a and 516b, corresponding to FIG. 5A and FIG. 5B, respectively. The orientation dependent radiation 104 corresponding to the rotation angle 516a depicted in FIG. 5A is indicated in FIG. 5C by dashed lines, showing the centroids 32a at the relative position 34 on the observation surface 106. Similarly, the orientation dependent radiation 104 corresponding to the rotation angle 516b depicted in FIG. 5B is illustrated in FIG. 5C by solid lines, showing the centroids 32b at the relative position 34b on the observation surface 106.

In both of the radiation patterns shown in FIG. 5C, it can be seen that the fraction of orientation dependent radiation 104 in view along the observation surface 106 from the exposed surface areas of supply radiation source 100 decreases gradually away from the centroids 32a and 32b along the horizontal axis 18. In this manner, for each rotation angle 516 of the orientation dependent source 500 about the vertical axis 19, a specific radiation pattern having one or more detectable centroids 32 is produced at one or more unique positions 34 on the observation surface 106. The number of detectable centroids 32 for a given rotation angle 516 is based at least in part on the manner in which the openings 28 and 27 of the first and second masks 24 and 20, respectively, are offset from each other, and the overall dimensions of the orientation dependent radiation source 500, as discussed further below.

While the orientation dependent radiation source 500 shown in FIGS. 1–4 has a substantially elongated shape, as indicated by horizontal axis 18, an orientation dependent radiation source according to various embodiments of the invention may have a number of geometric shapes and sizes, depending at least in part on the application for which the orientation dependent radiation source is used.

For example, an orientation dependent radiation source according to one embodiment of the invention may be as small as a quarter, and may be fabricated using conventional semiconductor fabrication techniques. According to other embodiments of the invention, an orientation dependent radiation source may be as large as a conventional billboard. Additionally, an orientation dependent radiation source may have a substantially rectangular or square-shaped observation surface 106, as in one embodiment of the invention discussed below in connection with FIGS. 11 and 12 for applications in which the rotation angle 516 may be determined about two axes of rotation. Similarly, according to other embodiments, the observation surface 106 may have a circular or elliptical shape. Moreover, an orientation dependent source itself may have a curved shape, and may be spherically or elliptically volumetric in form, as discussed further below in connection with FIGS. 6 and 19.

From the foregoing, it should be appreciated that a wide variety of geometric shapes and sizes may be suitable for an apparatus that produces orientation dependent radiation according to the invention. Furthermore, a wide variety of applications are contemplated for an orientation dependent radiation source according to various embodiments of the invention, including, but not limited to, high precision orientation measurements for sporting or movement training activities, package or object orientation identification for assembly line applications, holographic memory, and topography measurements of surfaces, including ocean floors and/or land masses, which techniques may employ supply sources and radiation sensors located above the earth, such as on a satellite.

Figure 6:
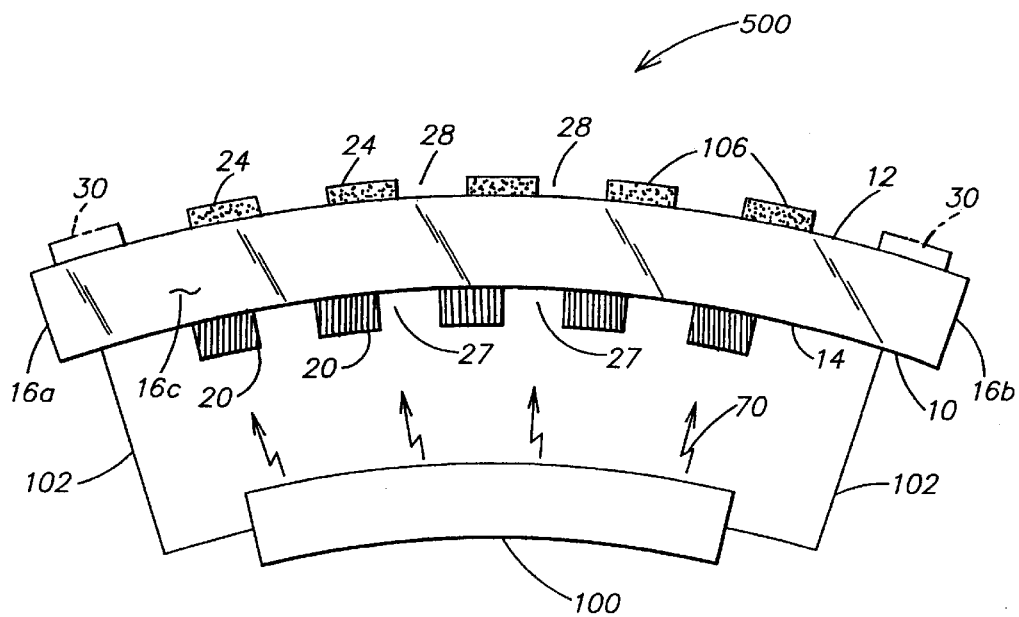
FIG. 6 is a top view similar to that of FIG. 4, showing an orientation dependent radiation source having a curved geometry according to one embodiment of the invention.

While FIG. 4 shows that the orientation dependent source 500 may have an essentially rectilinear geometry, wherein the first mask 24 is substantially planar and the second mask 20 and supply source 100 are arranged substantially parallel to the first mask, FIG. 6 shows an example of the apparatus of FIG. 4 having a curved geometry. While FIG. 6 shows that each of the first mask 24, the support structure 10, the second mask 20, and the supply source 100 are similarly curved and substantially parallel to each other, a combination of planar and various curved geometries amongst the first mask 24, the second mask 20, and the supply source 100 may be appropriate for various applications according to other embodiments.

Additionally, while the orientation dependent radiation source 500 shown in FIG. 6 has a primarily convex shaped observation surface 106, the source 500 may be constructed and arranged such that the observation surface 106 has a primarily concave shape. In either of the foregoing variations of FIG. 6, a convex or concave shape of the support structure 10 itself may enable the support structure 10 to function as a lens.

Figure 7:
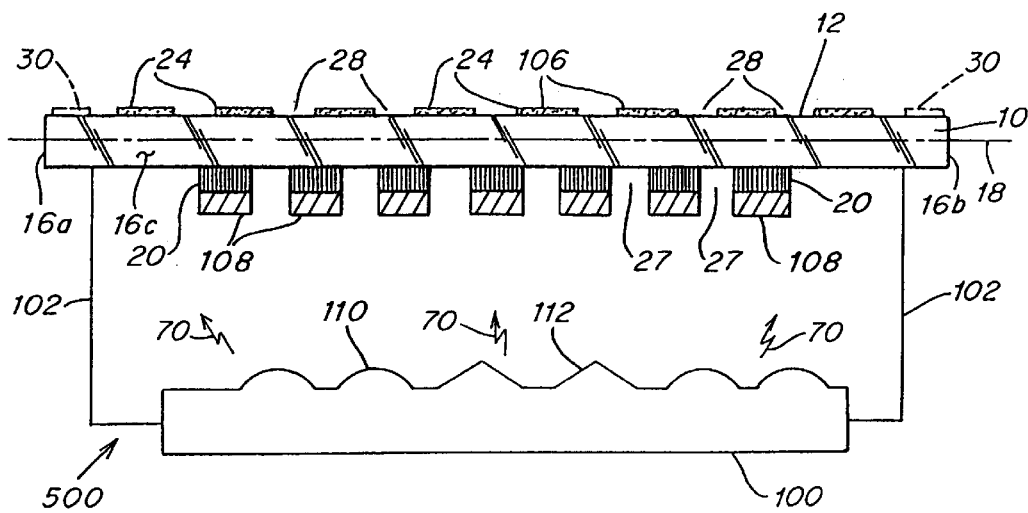
FIGS. 7, 8, 9, and 9A are top views showing several modifications of the orientation dependent radiation source of FIG. 4, according to various embodiments of the invention.

As discussed above in connection with FIGS. 1–4, in one embodiment of the invention the supply radiation source 100 may be a secondary radiation source such as a reflector. FIG. 7 shows such an embodiment of the apparatus shown in FIG. 4, in which the supply source 100 is a reflector. The orientation dependent source 500 of FIG. 7 additionally includes several features directed to "bias" or tailor the source radiation 70 reflected from the supply source reflector 100.

For example, FIG. 7 shows that a surface of the second mask 20 facing the reflector 100 may include a reflective coating 108. Furthermore, the reflector 100 may include a pattern of surface perturbations 110 and 112 arranged in a predetermined manner relative to the openings 27 of the second mask 20 and the openings 28 of the first mask 24. In particular, FIG. 7 shows that the surface perturbations may include one or more curved bumps 110 and/or one or more triangular bumps 112. One or both of the reflective coating 108 and the surface perturbations 110 and/or 112 may be employed to "condition" radiation 70 such that the orientation dependent radiation pattern including one or more detectable centroids 32 produced on the observation surface 106 is tailored in a predetermined manner. For example, a combination of reflective coating 108 and surface perturbations 110 and 112 may be employed to enhance the reflective properties of reflector 100 by providing for multiple reflections between the second mask 20 and reflector 100 so as to increase an intensity of one or more of the detectable centroids on the observation surface 106 for particular rotation angles.

In general, for embodiments of the orientation dependent source 500 according to the invention which include a reflector as the supply source 100, the reflector may be fabricated such that a reflectance of the reflector varies along one or both of a direction parallel to the horizontal axis 18 or a direction parallel to the vertical axis 19. In this manner, as described above in connection with FIG. 7, the orientation dependent radiation pattern produced on the observation surface 106 may be tailored so as to increase an intensity of the radiation pattern for particular rotation angles.

Additionally, the reflector 100 may be fabricated such that a granularity of the reflector varies in one or more directions parallel to the horizontal axis 18 and the vertical axis 19, such that the source radiation 70 is a specular reflection that varies in one or more directions parallel to the horizontal and vertical axis. For "two dimensional" embodiments of an orientation dependent radiation source according to the invention as discussed further below, the reflector 100 may be formed such that various reflective properties of the reflector vary radially from a point on the reflector 100, for example, a geometric center of the reflector 100, which may in some cases essentially correspond to a geometric center of the observation surface 106. In this manner, an intensity of the orientation dependent radiation pattern on the observation surface 106 can be made to vary radially with rotation angles about both the horizontal axis 18 and the vertical axis 19.

In yet other embodiments of the orientation dependent radiation source 500 shown in FIGS. 1–4 which include a reflector as the supply radiation source 100, the reflector 100 may also include at least one retro-reflector. In particular, with reference again to FIG. 7, the reflector 100, as well as any reflective coatings 108, may be formed of retro-reflective material. As discussed above, a distinctive property of retro-reflectors and retro-reflective material is that radiation incident to the retro-reflector or retro-reflective material is returned in a direction parallel to the incident radiation. Several forms of retro-reflectors and retro-reflective materials are commercially available and are suitable for purposes of the present invention. For example, some retro-reflectors are manufactured as thin films and may have adhesive surfaces such that the retro-reflectors may be used as strips of reflective tape. Other forms of retro-reflecting materials include spreadable mixtures including suspended retro-reflective particles, wherein the spreadable mixture is readily adherable to a variety of surfaces.

Figure 8:
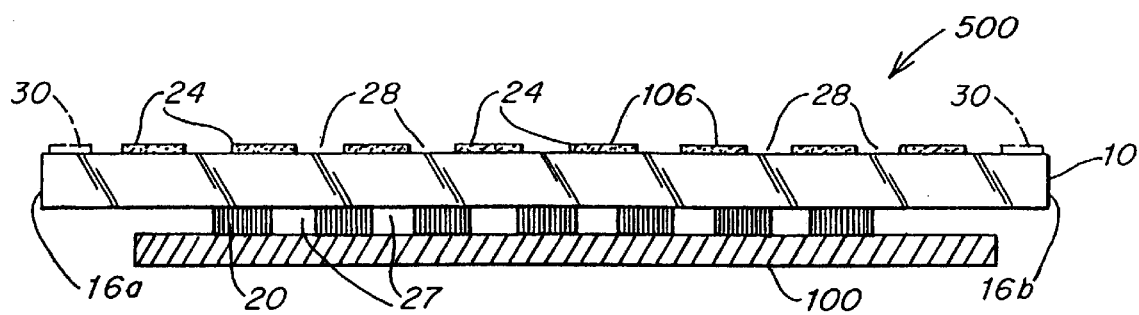
Figure 9:
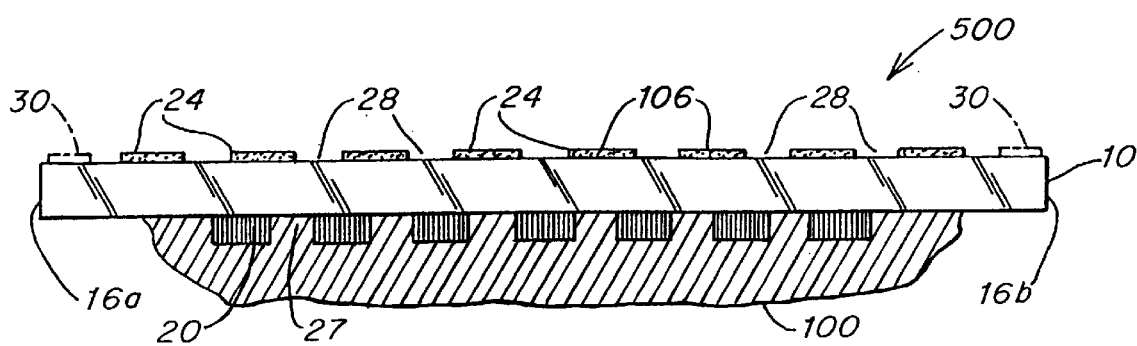

FIG. 8 shows an example of the apparatus of FIG. 4 according to one embodiment of the invention, in which a secondary supply radiation source such as reflector 100 is coupled as a sheet of material to the second mask 20. The sheet reflector 100 may be made of retro-reflective material, as discussed above, and/or may be adhesively coupled to the second mask 20. Additionally, the sheet reflector 100 may include a retro-reflective pattern or may include a pattern of surface perturbations, as discussed above in connection with FIG. 7. FIG. 9 shows an example of the apparatus of FIG. 4 according to yet another embodiment, in which the reflector 100 is formed by a spreadable mixture applied over the second mask 20, wherein the spreadable mixture includes suspended retro-reflective particles.

Figure 9A:
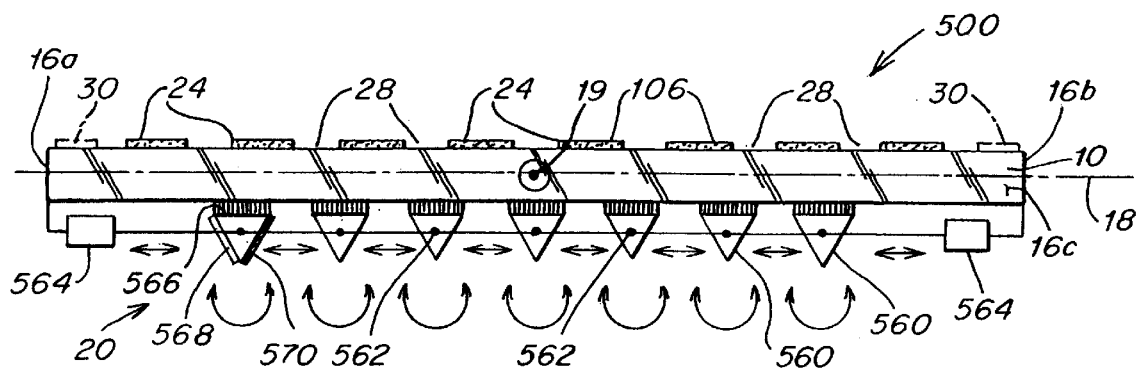
Figure 9B:
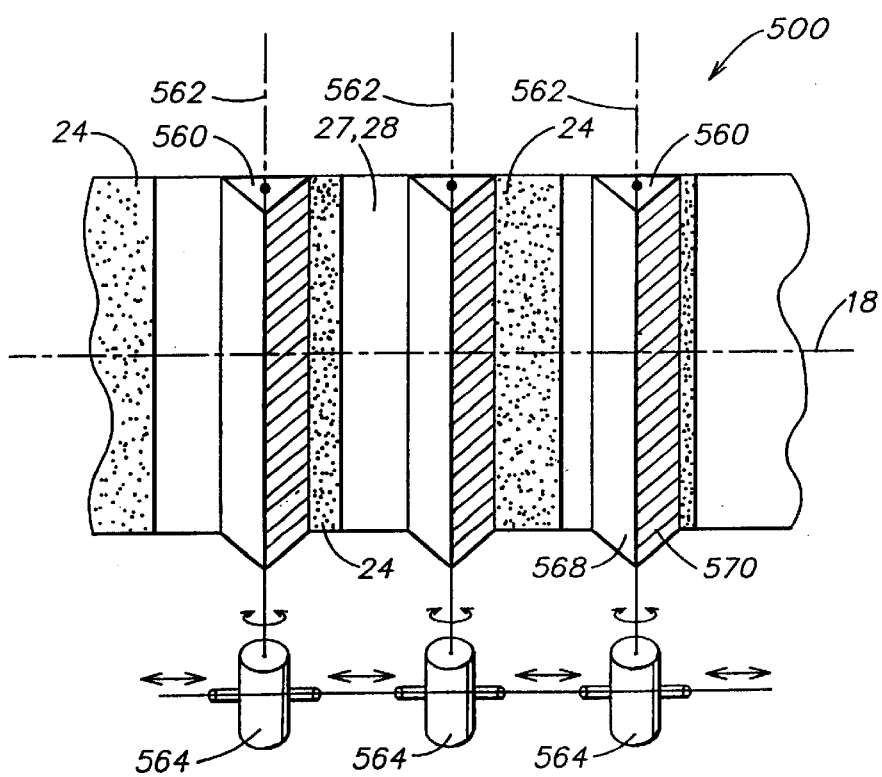
FIG. 9B is a back view of the orientation dependent radiation source shown in FIG. 9A.

FIGS. 9A and 9B illustrate another embodiment of an orientation dependent radiation source according to the invention in which the second mask 20 may include a plurality of polygon-shaped rods 560. Each polygon-shaped rod 560, shown in FIGS. 9A and 9B for purposes of illustration as triangular-shaped rods, may have a plurality of faces 566, 568, and 570. Each rod 560 is aligned essentially parallel to the vertical axis 19 and is translatable along a direction parallel to the observation surface 106, or horizontal axis 18. Additionally, each rod 560 is rotatable about a rod axis 562 passing through a geometric center of the rod 560. FIG. 9A shows a top view similar to that of FIG. 4, while FIG. 9B shows a rear view of the apparatus shown in FIG. 9A.

The embodiment of an orientation dependent radiation source 500 shown in FIGS. 9A and 9B includes at least one translational and rotational controller 564 to independently rotate each rod 560 about a respective rod axis 562. The one or more translational and rotational controllers 564 additionally translate each rod 560 independently along a direction parallel to the observation surface 106 such that the openings 27 are offset relative to the openings 28 of the first mask 24 to provide an orientation dependent radiation pattern on the observation surface 106, as discussed above in connection with FIGS. 5A–C.

As shown in FIGS. 9A and 9B, each rod 560 may be a triangular-shaped rod having three faces, 566, 568, and 570. In one embodiment, a first face of each rod may include a reflector, a second face of each rod may include a retro-reflector, and a third face of each rod may include a non reflective material. Moreover, in one embodiment, the one or more translational and rotational controllers 564 may be operated such that a same face of each rod is parallel to the observation surface at any given time; namely, the second mask 20 may be formed by all the same faces of each rod 560.

In yet another embodiment involving mechanical movement of parts within the orientation dependent radiation source 500, the supply radiation source 100 as shown in FIG. 4 may include a controllable, movable, micro-mirror assembly. One example of such a controllable movable micro-mirror assembly suitable for purposes of the invention is given by, but is not limited to, a Digital Micromirror Device™(DMD™) manufactured by Texas Instruments, and described in the Texas Instruments publication "Current Status and Future Applications for DMD™-Based Projection Displays," authored by Larry J. Hornbeck.

In the Digital Micromirror Device™, a reflective array of fast, digital light switches are monolithically integrated onto a silicon address chip (memory cell). Each digital light switch is an aluminum micro-mirror that can reflect light in one of two directions, depending on the state of an underlying memory cell. The micro-mirrors are rotated by electrostatic attraction produced by voltage differences developed across an air gap between each micro-mirror and its associated memory cell.

Figure 10:
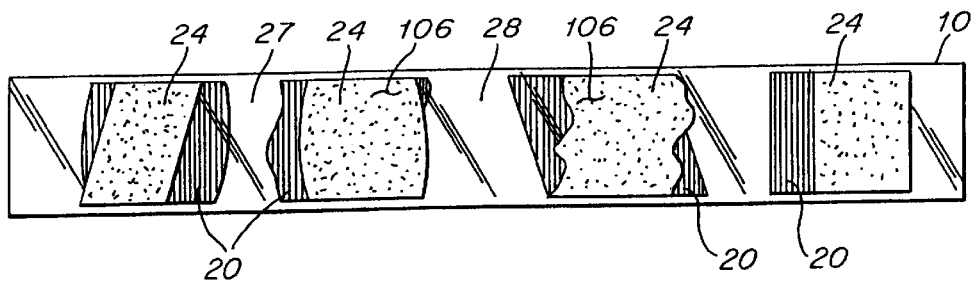
FIG. 10 is a front view similar to that of FIG. 1D, showing examples of different mask geometries according to various embodiments of the invention.

With reference again to FIG. 1D, the first and second masks 24 and 20, respectively, are shown as essentially rectilinear structures including similar patterns of openings 28 and 27, respectively. FIG. 10 illustrates that, according to other embodiments of the invention, the masks 24 and 20 and their corresponding openings 28 and 27 may have a variety of arbitrary geometric shapes which are relatively offset and have a desired spatial relationship such that an orientation dependent radiation pattern is produced on the observation surface 106 having one or more detectable centroids that vary in position across the observation surface 106 based on a rotation angle of the first and second masks about one or more axes of rotation. In FIG. 10, which is a front view of the orientation dependent radiation source 500 similar to that of FIG. 1D, the openings 27 and 28 are shown with a variety of shapes or profiles, including both rectilinear and curved shapes. Additionally, some or all of the openings 27 and 28 may be circular, and some or all of the openings 27 and 28 may or may not be identical, according to various embodiments.

Figure 11A:
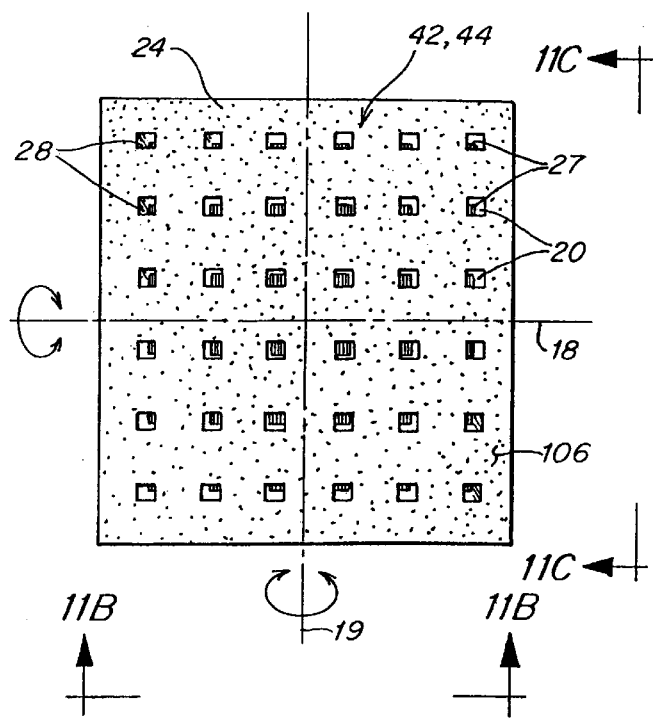
FIGS. 11A–C are front and side views of an apparatus according to one embodiment of the invention suitable for providing orientation dependent radiation patterns based on a rotation about two orthogonal axes.
Figure 11C:
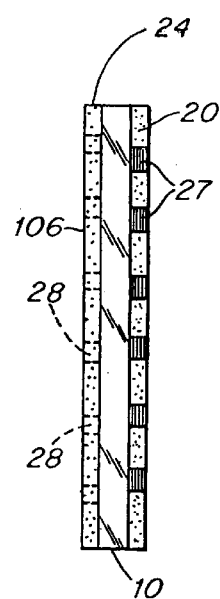
Figure 11B:
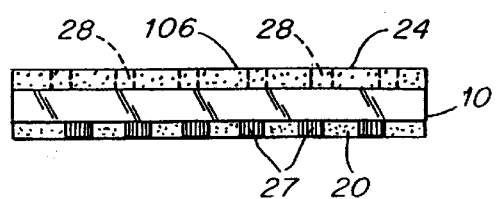

FIGS. 11A–C illustrate another embodiment of an orientation dependent radiation source according to the invention which facilitates the determination of orientation in two dimensions and, namely, about two axes of rotation 18 and 19, respectively. The apparatus shown in FIGS. 11A–C may be constructed and assembled similarly to that of the apparatus discussed above in connection with FIGS. 1D, 2, 3, and 4. For ease of illustration, FIGS. 11A–C show only the first mask 24, the second mask 20 and the support structure 10. In FIG. 11A, the openings 28 in the first mask 24 can be seen to be in the form of a first two-dimensional pattern 42. Similarly, the openings 27 in the second mask 20 can be seen to be in the form of a second two-dimensional pattern 44.

To more clearly illustrate the relationship between the openings 28 and the openings 27 in FIGS. 11A–C, the openings 28 are shown as empty rectangles, while the openings 27 appear as rectangles enclosing a series of vertical lines. It should be appreciated that this method of illustrating the second mask 20 and the openings 27 is different from that of FIGS. 1D, 2, 3, and 4, in which the radiation blocking portions of first mask 20 are indicated by areas filled with vertical lines. Notwithstanding the different notation, the openings 27 and 28 of the first and second patterns 42 and 44 are arranged similarly to those of the apparatus shown in FIGS. 1D, 2, 3, and 4, such that surface areas of a supply source exposed through the openings 27 and 28 vary with the rotation of the apparatus about either the horizontal axis 18 or the horizontal axis 19. For a particular orientation, an orientation dependent radiation pattern is produced on the observation surface 106 having one or more detectable centroids that vary in position across the observation surface 106 in two dimensions, corresponding to the orientation of the apparatus shown in FIGS. 11A–C.

Figure 12A:
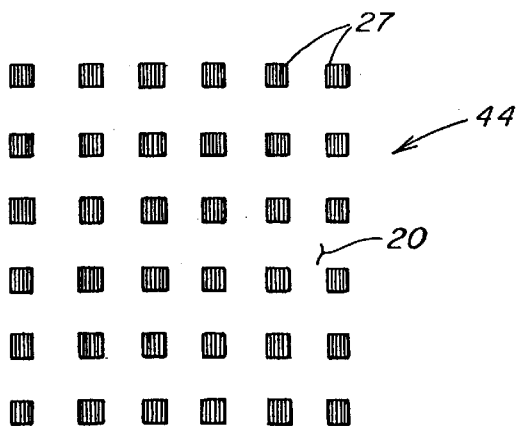
FIGS. 12A–C are diagrams showing a relative position of two-dimensional patterns formed by first and second mask openings, respectively, in the apparatus of FIGS. 11A–C.
Figure 12B:
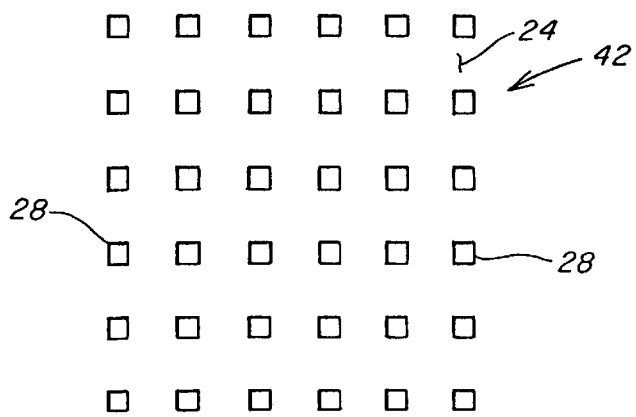
Figure 12C:
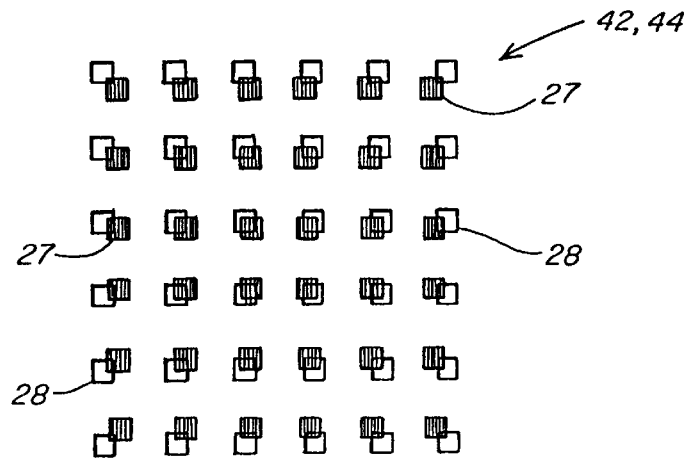

The offset nature of the openings 27 relative to the openings 28 may also be observed in the side views of FIGS. 11B and 11C. Additionally, FIGS. 12A–C serve to clarify the relative positions of the openings 27 of the two-dimensional pattern 44 and the openings 28 of the two-dimensional pattern 42. In particular, FIG. 12C shows an overlay of the two-dimensional pattern 42 on the twodimensional pattern 44 as viewed looking on to the observation surface 106 of the apparatus shown in FIG. 11A.

It should be appreciated that while FIGS. 11 and 12 show rectilinear structures and patterns, a variety of geometric shapes and dimensions may be suitable for both the observation surface 106 of the apparatus shown in FIGS. 11A–C, as well as the openings 27 of the two-dimensional pattern 44 or of the openings 28 of the two-dimensional pattern 42, as discussed above in connection with FIG. 10. The selection of geometric shape and dimension for any of the foregoing parameters, including the arrangement of openings 27 and 28 in the patterns 44 and 42, may be dictated at least in part by the application for which the apparatus according to the invention is used. For example, as discussed above, the observation surface 106 may have a rectangular, circular or elliptical shape. Furthermore, the patterns 42 and 44, including the shapes and positions of the openings 27 and 28, may be configured such that a first sensitivity of the position of one or more radiation centroids along the horizontal axis 18 based on a rotation of the apparatus about the vertical axis 19, is greater than a second sensitivity of the position of the one or more centroids along the vertical axis 19 based on a rotation of the apparatus about the horizontal axis 18. Of course, the patterns 42 and 44 may be configured and arranged such that the converse is true.

Figure 12D:
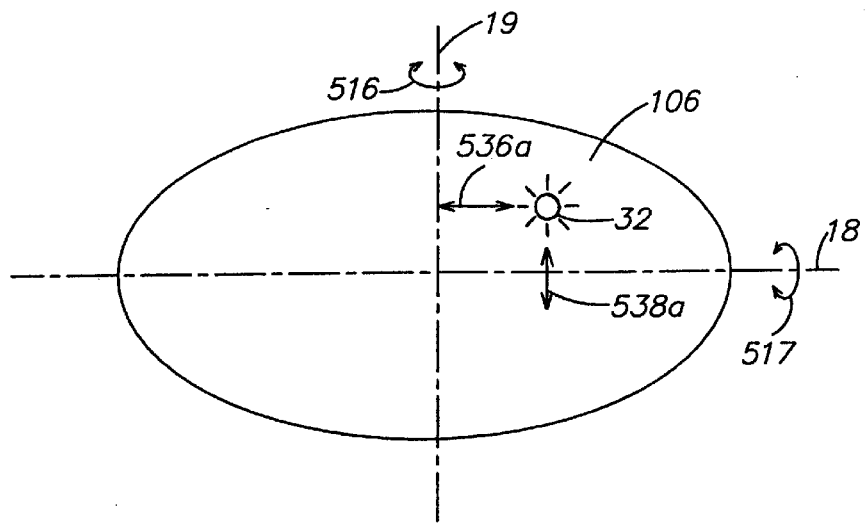
FIGS. 12D–E are front views of an apparatus similar to that shown in FIGS. 11A–C, having an elliptical observation surface according to one embodiment of the invention.
Figure 12E:
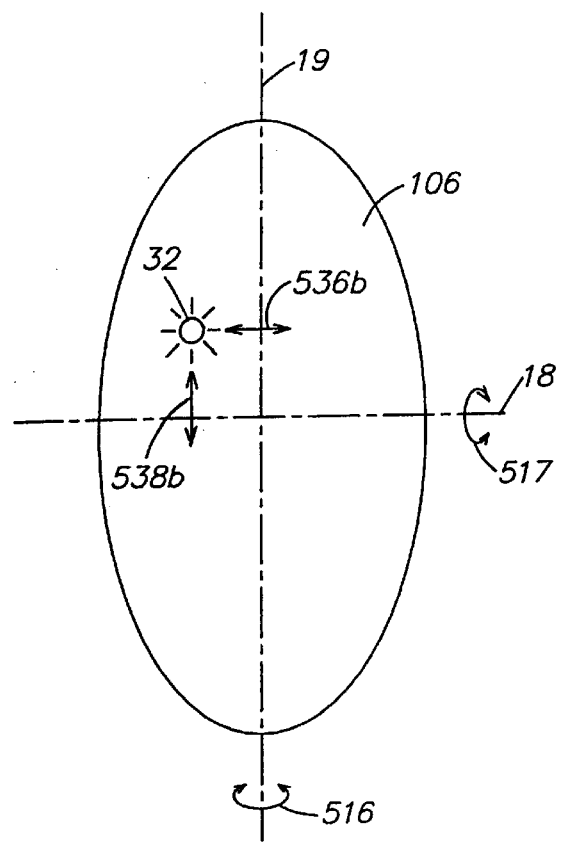

In particular, FIGS. 12D and 12E show orientation dependent radiation sources with observation surfaces 106 having elliptical shapes, according to one embodiment of the invention. In FIG. 12D, the horizontal axis 18 serves as a major axis of the elliptical observation surface, while in FIG. 12E the vertical axis 19 serves as the major axis of the observation surface. In the apparatus of FIG. 12D, the patterns 42 and 44 (not shown) may be configured and arranged such that the centroid 32 moves a first vertical distance 538a as a result of a rotation 517 about the axis 18 that is less than a first horizontal distance 536a traveled by the centroid 32 as a result of a same amount of rotation 516 about the axis 19. Hence, a "horizontal sensitivity" of the centroid 32 is greater than a "vertical sensitivity" of the centroid 32.

Likewise, in the apparatus of FIG. 12E, the patterns 42 and 44 (not shown) may be configured and arranged such that the centroid 32 moves a second vertical distance 538b as a result of a rotation 517 about the axis 18 that is greater than a second horizontal distance 536b traveled by the centroid 32 as a result of an equivalent rotation 516 about the axis 19. Hence, in FIG. 12E, a horizontal sensitivity of the centroid 32 is less than a vertical sensitivity of the centroid 32.

Figure 13:
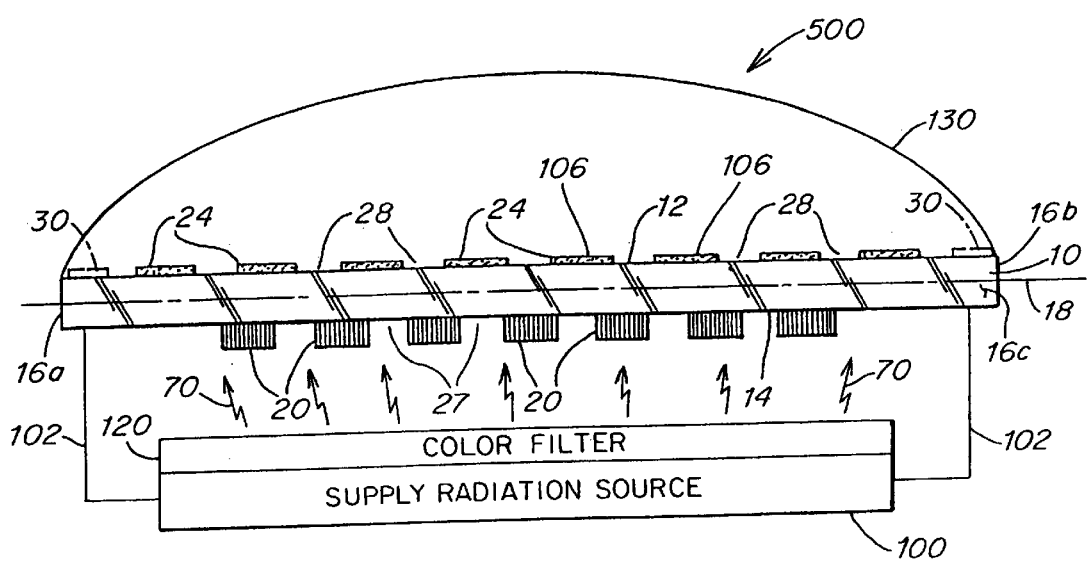
FIG. 13 is a top view similar to that of FIG. 4, showing another embodiment of an apparatus according to the invention which includes one or more color filters.

FIG. 13 shows yet another embodiment of an orientation dependent radiation source according to the invention, which has particular utility for applications in which the source radiation 70 is visibly observable. FIG. 13, which is similar to the top view of FIG. 4, shows that the orientation dependent source 500 may include one or more color filters 120. While FIG. 13 shows that one or more color filters 120 may be disposed between the second mask 20 and the supply source 100, the support structure 10 may be a substantially transparent substrate to which the first mask 24 and the second mask 20 are coupled, as discussed above, and the substrate support structure 10 may include one or more color filters alternatively to, or in addition to, the color filter 120 shown in FIG. 13. Furthermore, at least one of the first mask 24 and the second mask 20 may include a color filter.

Figure 14A:
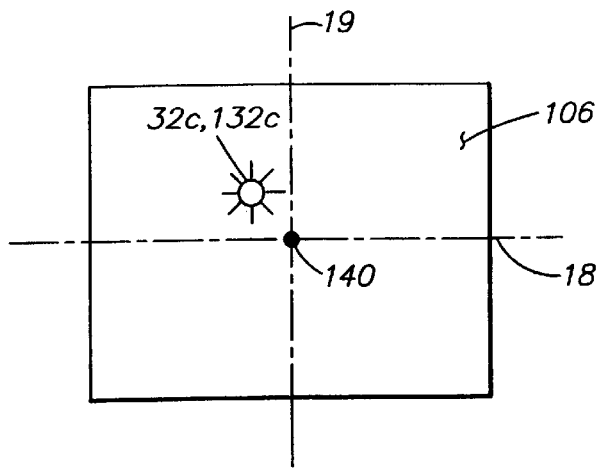
FIGS. 14A–C are diagrams showing a variation of the color of the radiation pattern produced by an apparatus similar to that shown in FIGS. 11A–C, according to one embodiment of the invention.
Figure 14B:
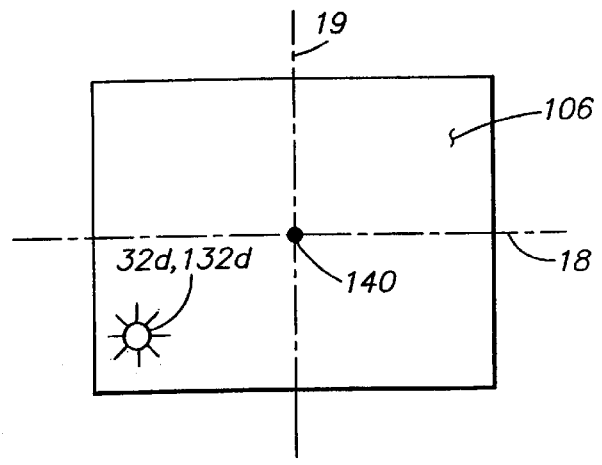

With reference again to FIGS. 5A and 5B, as well as FIGS. 14A and 14B, a color filter 120 according to the invention is preferably constructed and arranged such that a color 132 of the detectable centroid 32 varies as the position 34 of the detectable centroid 32 varies across the observation surface 106 of the orientation dependent source 500, as the source 500 is rotated about one or more axes of rotation. For example, in FIGS. 5A and 5B in which the source 500 is rotated about the vertical axis 19, in one embodiment the color 132a of the centroid 32a varies from left to right along the horizontal axis 18 of the observation surface 106. In particular, while the color 132A of centroid 32a of FIG. 5A at position 34a in FIG. 5A may be red, the color 132b of centroid 32b at position 34b in FIG. 5B may be blue.

In embodiments of the invention similar to that shown in FIGS. 11A–C, in which one or more detectable centroids 32 may vary in position 34 in two dimensions, one or more color filters 120 may be constructed and arranged such that the color 132 of the centroid 32 varies radially along the observation surface 106 from a point on the observation surface, such as, for example, a geometric center 140 of the observation surface 106. Similarly to FIGS. 5A and 5B, the color 132c of centroid 32c shown in FIG. 14A may be red, corresponding to a particular rotation about the horizontal and vertical axes and, hence, a particular position on the observation surface 106, while the color 132d of centroid 32d shown in FIG. 14B may be blue, corresponding to a different rotation about the axes 18 and 19 and a different position.

Figure 14C:
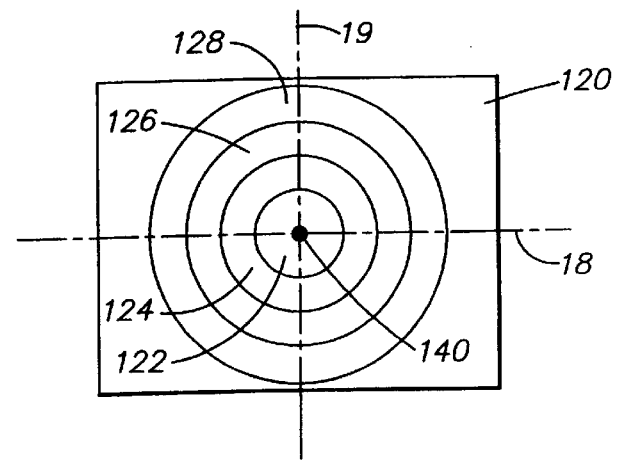

FIG. 14C shows one example of a color filter 120 that may be suitable for purposes of the apparatus shown in FIGS. 11A–C, and other "two-dimensional" embodiments of the invention. The color filter 120 of FIG. 14C includes a number of concentric regions 122, 124, 126 and 128, as in a "dart-board" configuration, each region corresponding to a particular color, for example, red, yellow, green and blue, respectively. Alternatively, rather than discrete color regions as shown in FIG. 14C, the color filter 120 according to other embodiments may provide a radially graduated spectrum of color from a point on the filter, such as the geometric center 140, to a periphery of the color filter 120. Examples of color filters 120 suitable for purposes of the invention include, but are not limited to, diffraction gratings, colored glass-like materials or plastics, and thin films containing a variety of dyes.

In a manner similar to that of one or more color filters 120, an orientation dependent radiation source according to one embodiment of the invention may include one or more non-uniform polarizing filters. With reference again to FIGS. 13 and FIGS. 14A–C, while a non-uniform polarizing filter is not explicitly shown in the figures, one or more such filters may be employed in an apparatus according to one embodiment of the invention, in place of, or in addition to, one or more color filters 120, and may be implemented in a manner similar to that of one or more color filters, as discussed above in connection with FIGS. 13 and FIGS. 14A–C.

In particular, a non-uniform polarizing filter may be disposed between the second mask 20 and the supply source 100 or may be implemented within a substrate support structure 10. One or more non-uniform polarizing filters may be constructed and arranged such that a polarization of one or more detectable centroids varies as a position of the one or more centroids varies across the observation surface 106 corresponding to a rotation about one or both of the horizontal axis 18 and he vertical axis 19.

Additionally, as illustrated in FIG. 14C in connection with color filter 120, one example of non-uniform polarizing filter suitable for purposes of the invention may include a number of concentric regions, wherein each region corresponds to a particular polarization. Alternatively, as with the color filter 120, a non-uniform polarization filter may be radially graduated from a point on the filter, such as a geometric center, to a periphery of the polarization filter. Examples of non-uniform polarization filters suitable for purposes of the invention include, but are not limited to, materials incorporating birefringent crystals, retardation plates such as quartz or mica retardation plates, and dichroic sheet polarizers incorporating materials such as polymers and plastics and/or organic dyes.

In a manner similar to that of one or more color and/or non-uniform polarizing filters, an orientation dependent radiation source according to one embodiment of the invention may include one or more neutral density (wavelength invariant) filters having a variety of absorption and transmittance properties, or radiation densities. With reference again to FIGS. 13 and FIGS. 14A–C, while a neutral density filter is not explicitly shown in the figures, one or more such filters may be employed in an apparatus according to one embodiment of the invention, in place of, or in addition to, one or more color and/or non-uniform polarizing filters, and may be implemented in a manner similar to that of one or more color filters, as discussed above in connection with FIGS. 13 and FIGS. 14A–C.

In particular, one or more neutral density filters may be disposed between the second mask 20 and the supply source 100 or may be implemented within a substrate support structure 10. One or more neutral density filters may be constructed and arranged such that an intensity of one or more detectable centroids varies as a position of the one or more centroids varies across the observation surface 106 corresponding to a rotation about one or both of the horizontal axis 18 and the vertical axis 19.

Additionally, as illustrated in FIG. 14C in connection with color filter 120, one example of a neutral density filter suitable for purposes of the invention may include a number of concentric regions, wherein each region corresponds to a particular absorption or transmittance. Alternatively, as with the color filter 120, a neutral density filter may be radially graduated from a point on the filter, such as a geometric center, to a periphery of the neutral density filter. Examples of neutral density filters suitable for purposes of the invention include, but are not limited to, thin metallic films such as iconel, chromium, and nickel, which are particularly insensitive to wavelength.

As illustrated in FIG. 13, an orientation dependent radiation source 500 according to one embodiment of the invention may include a lens 130 coupled to the observation surface 106. With reference again to FIG. 1A, lens 130 may be used to adjust the observation angle 510, or "breadth" of observation area 502 from which the observation surface 106 is observed, as a function of the distance 508 between the orientation dependent source 500 and the observation area 502. While FIG. 13 shows that lens 130 has an essentially convex shape, a variety of lens types may be employed with an apparatus according to various embodiments of the invention to facilitate a variety of focusing applications.

FIGS. 15 and 16 illustrate two additional embodiments of an orientation dependent radiation source according to the invention, similar to that disclosed in U.S. application Ser. No. 08/698,115, herein incorporated by reference. FIGS. 15A–D show an orientation dependent reflector 5 constructed and arranged similarly to the apparatus shown in FIGS. 1D, 2, 3, and 4. The specific embodiment of the orientation dependent reflector 5 shown in FIGS. 15A–D includes a transparent substrate 10 having a front surface 12, a back surface 14, and opposing end surfaces 16a and 16b. Preferably, the transparent substrate 10 is formed from a material exhibiting a hardness and smoothness suitable for depositing material thereon by way of standard thin and thick film processes commonly used in industry. Alternatively, the transparent substrate 10 may be textured so as to exhibit retro-reflecting properties (not shown) or may be sufficiently smooth to readily accept adhesive sheet portions of a large sheet of retro-reflecting material (not shown), as discussed above in connection with FIG. 8.

Coupled to the back surface 14 of the transparent substrate 10 is a retro-reflective pattern 20 including a plurality of retro-reflecting patches 22 which are parallel aligned and rectangular in shape. The plurality of retro-reflecting patches 22 are positioned spatially along and perpendicular to the longitudinal axis 18 of the transparent substrate 10. Preferably, the retro-reflecting patches 22 are formed from a spreadable suspension of retro-reflecting particles which is readily adherable to the back surface 14. Alternatively, the retro-reflecting patches 22 may be formed by portions of a retro-reflective material in sheet form.

In the apparatus of FIGS. 15A–D, coupled to the front surface 12 of the transparent substrate 10 is an opaque filter 24 which may be formed by an opaque film layer 26 having a plurality of openings 28 therein. The plurality of openings 28 allow radiation to pass through the transparent substrate 10 and reflect off of the plurality of retro-reflecting patches 22 positioned on the back surface 14. The plurality of openings 28 are in the form of parallel slits aligned perpendicular to and spatially along the longitudinal axis 18 of the transparent substrate 10. The plurality of openings 28 is offset relative to the retro-reflective pattern 20 formed by the retro-reflecting patches 22 to provide a reflection having one or more detectable centroids that vary in position across the front surface 12 based on the rotation of the transparent substrate 10 about at least one axis of rotation. In particular, depending upon the incident angle of arrival of radiation on the orientation dependent reflector 5, only specific retro-reflecting patches 22 are exposed thereby producing the centroid of reflection, as discussed above in connection with FIGS. 5A–C.

Figure 15A:
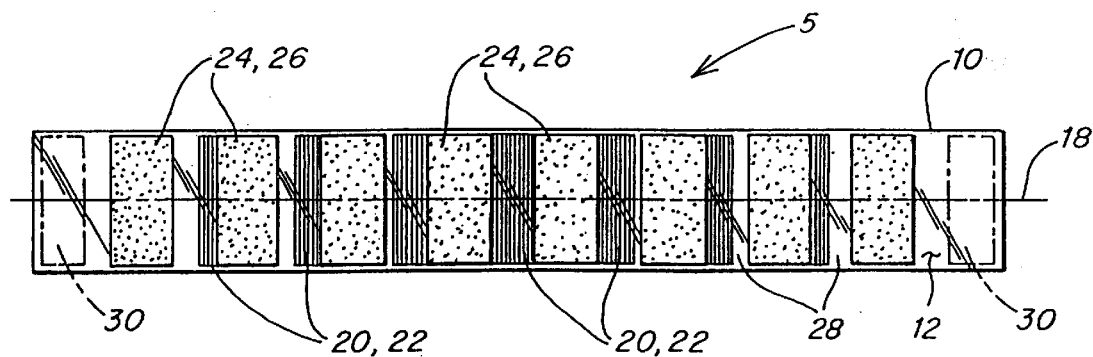
FIGS. 15A–D are diagrams showing an orientation dependent reflector suitable for a determination of orientation in one dimension, according to one embodiment of the invention.
Figure 15B:
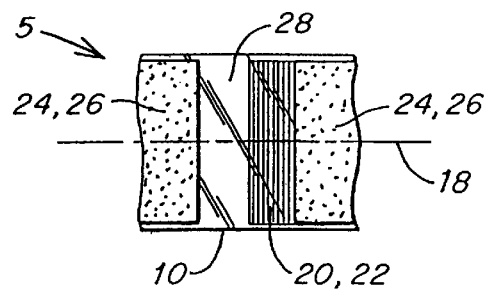
Figure 15C:
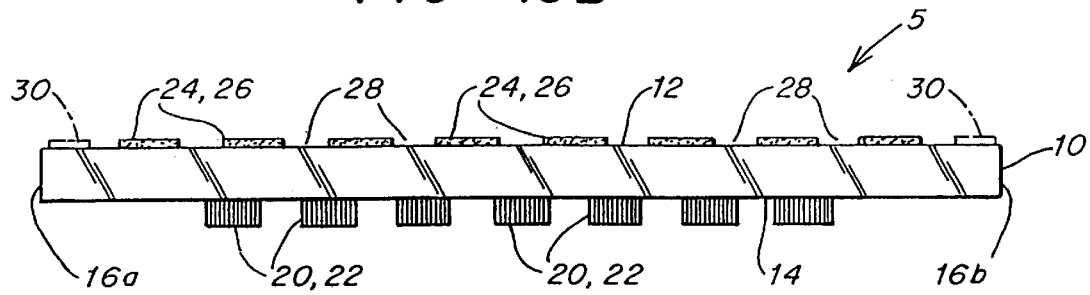
Figure 15D:
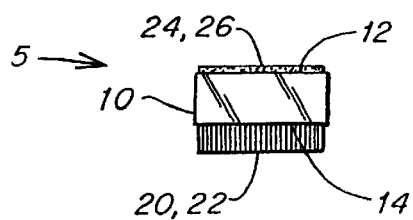
Figure 16A:
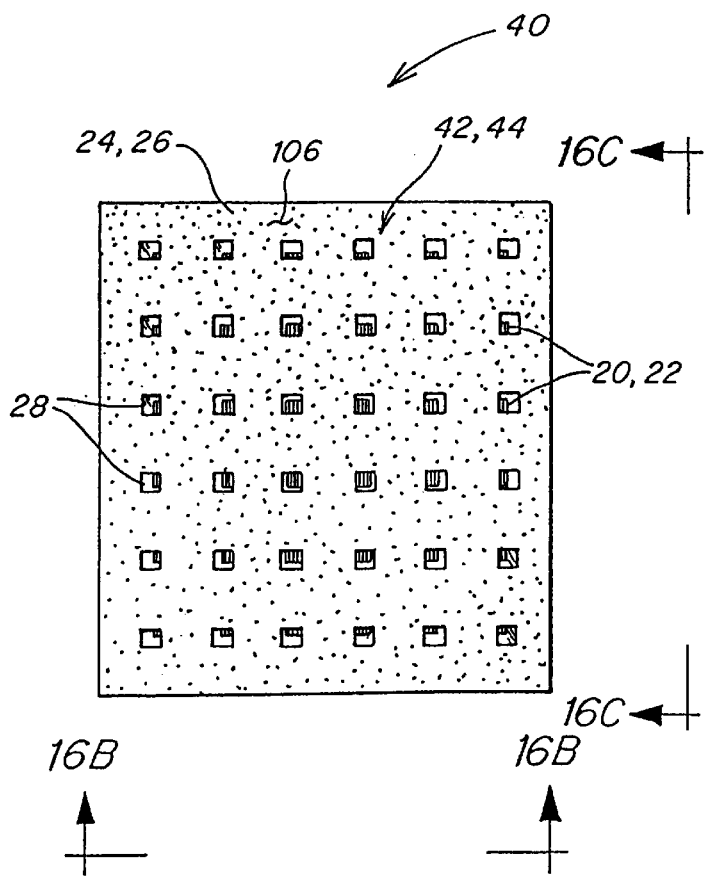
FIGS. 16A–C are diagrams showing an orientation dependent reflector suitable for a determination of orientation in two-dimensions, according to one embodiment of the invention.
Figure 16C:
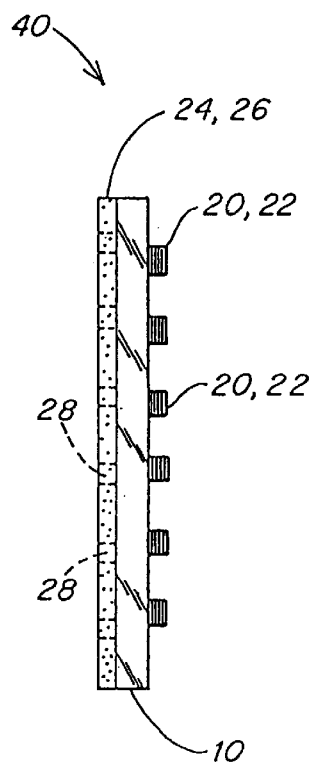
Figure 16B:
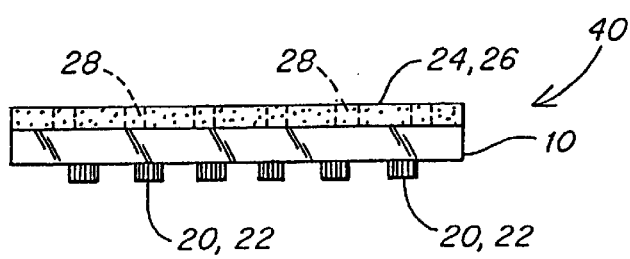

An example of one possible construction of the orientation dependent reflector 5 shown in FIGS. 15A–C is dimensionally described as follows:

Length: 1 (cm)
Width: 0.5 (cm)
Transparent substrate thickness: 280 ($\mu$m)
Number of openings: 30
Opening spacing: 330 ($\mu$m)
Reflecting patch spacing: 325 ($\mu$m)
Retro reflecting patch width: 33 ($\mu$m)
Orientation for viewing first retro reflecting patch: +15°
Orientation for viewing last retro reflecting patch: −15°
Angle range over which some part of a retro reflecting patch is visible: +/−6.8°
Sensitivity: 330 ($\pi$m/deg)
Percent area exposed through openings: 10%
Total number of retro reflecting patches visible at one time: 11
Effective number of retro reflecting patches reflecting: 6.4
Effective orientation dependent reflector area: 1.06 (sq mm) FIGS. 16A–C show another embodiment of an orientation dependent reflector 40 according to the invention which may be used to determine orientation in two dimensions or about two axes of rotation. The orientation dependent reflector 40 is formed similarly to orientation dependent reflector 5, shown in FIGS. 15A–D. In the orientation dependent reflector 40, the plurality of openings 28 in the opaque film layer 26 are in the form of a two-dimensional pattern 42. Similarly, the plurality of retro-reflecting patches 22 are in the form of a two-dimensional pattern 44. The two-dimensional pattern 42, or the plurality of openings 28, are designed to cooperate with the two-dimensional pattern 44 of the plurality of retro-reflecting patches 22 such that exposure thereof co-varies with a specific angular orientation about one or more axes. Accordingly, for a specific angular orientation, the orientation dependent reflector 40 provides a radiation pattern across the observation surface 106 of opaque film layer 26 having one or more detectable centroids that vary in position across the observation surface, based on a rotation of the orientation dependent reflector 40 about one or both axes of rotation. The offset nature of the plurality of openings 28 relative to the plurality of retro-reflecting patches 22 is further evident in FIGS. 16B and 16C.

Figure 17:
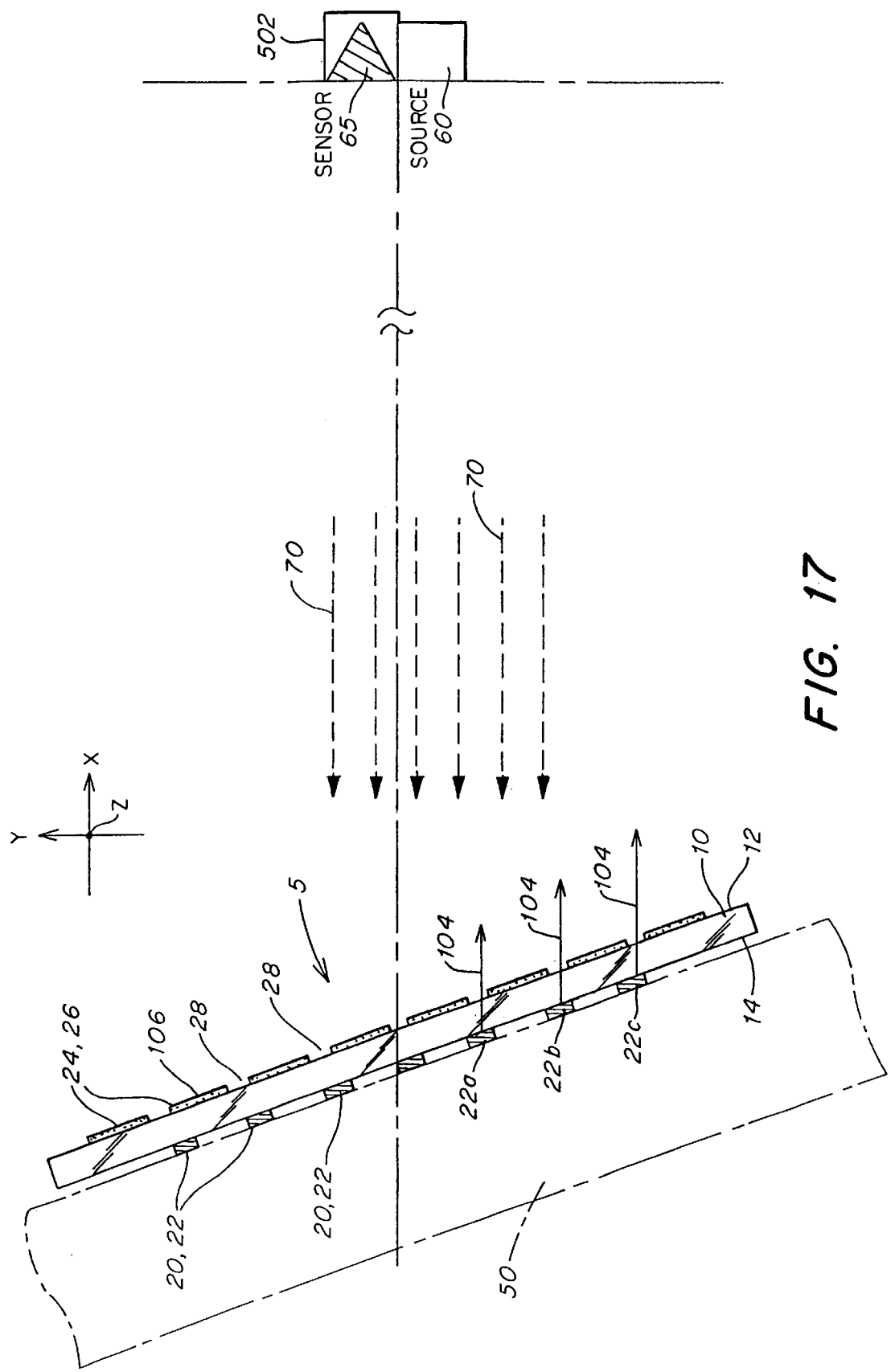
FIG. 17 is a diagram similar to that of FIGS. 1A, 1B, and 1C, showing an orientation detection system according to another embodiment of the invention.

FIG. 17 shows another example of an orientation detection system according to one embodiment of the invention. For purposes of illustration in the system of FIG. 17, the orientation dependent reflector 5 of FIGS. 15A–D is shown coupled to an object 50. It should be appreciated, however, that any of the orientation dependent radiation sources described above according to various embodiments of the invention may be employed in a system similar to that shown in FIG. 17. In addition to the orientation dependent reflector 5, the system of FIG. 17 includes a primary radiation source 60 and a radiation sensor 65. The radiation source 60 is preferably capable of transmitting radiation indicated by arrows 70 of sufficient strength, such that reflected radiation 104 forms a radiation pattern on the observation surface 106 of orientation dependent reflector 5 having one or more centroids that are detectable by the sensor 65. The sensor 65 may be any one of a number of conventional sensors available for different types and ranges of radiation and, in particular, may be a human eye.

FIG. 17 shows that the radiation source 60 and the radiation sensor 65 are preferably positioned adjacent one another at a distance away from the orientation dependent reflector 5. As the orientation dependent reflector 5 rotates about the z- axis indicated in FIG. 17, only specific retro-reflecting patches 22 are exposed to the incident radiation 70 and, hence, reflect radiation 104 parallel to the angle of incidence. For example, at the particular rotation angle depicted in FIG. 17, while radiation 70 is incident to the entire observation surface 106 of the orientation dependent reflector 5, only retro-reflecting patches 22a, 22b, and 22c are exposed to the incident radiation 70 and reflect orientation dependent radiation 104. As discussed above in connection with FIGS. 5A, B and C, a specific orientation of the object 50 may be determined from the position of one or more centroids of reflection as observed on the surface of the orientation-dependent reflector 5 by the sensor 65 in the observation area 502.

Figure 18:
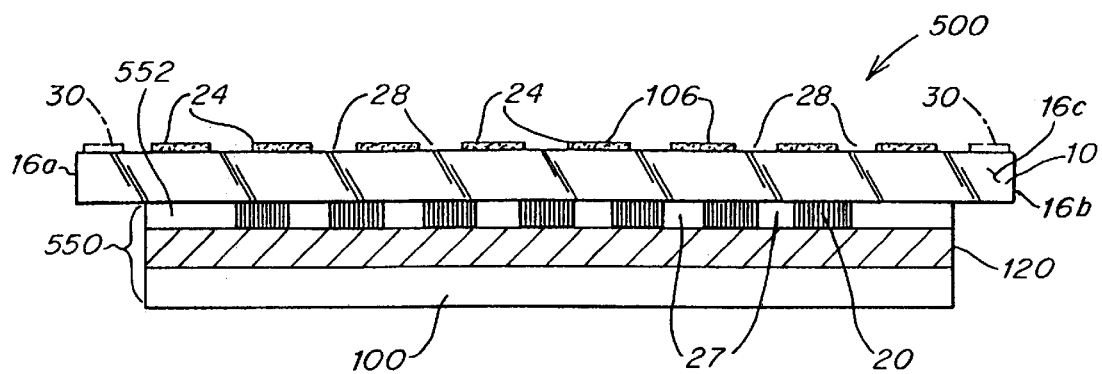
FIG. 18 is a top view similar to that of FIG. 4, showing an orientation dependent radiation source including a liquid crystal display, according to one embodiment of the invention.

FIG. 18 shows another embodiment of an orientation dependent radiation source 500 according to the invention. While FIG. 18 is a top view of the orientation dependent radiation source 500 similar to that of FIG. 4, it should be appreciated that the features of the orientation dependent radiation source 500 illustrated in FIG. 18 may be applicable to various apparatus according to the invention suitable for determining rotation about one or two axes of rotation; namely, the features illustrated in FIG. 18 are applicable for both one and two dimensional applications.

In the apparatus of FIG. 18, the second mask 20 may be formed by a controllable transmissive or reflective liquid crystal display 550. While FIG. 18 shows a pattern of essentially evenly spaced rectangles for the second mask 20, by virtue of the controllable nature of liquid crystal display 550, the second mask pattern 20 including the openings 27 may include a variety of shapes, sizes, and patterns and may be altered dynamically during normal operation of the orientation dependent radiation source 500.

For embodiments in which the liquid crystal display 550 is a transmissive-type liquid crystal display, the liquid crystal display 550 may include a primary supply source 100 to "back-light" the second mask 20. For other embodiments in which the liquid crystal display 550 may be a controllable reflective-type liquid crystal display, the liquid crystal display 550 may include both the second mask 20 and a secondary supply source or reflector 100.

For both the transmissive and reflective-type controllable liquid crystal displays 550, the region 552 in which the second mask 20 is formed may be constructed and arranged as a cell formed between two glass or glass-like plates, each plate having a conductive coating. The cell 552 is filled with a liquid crystal material. The liquid crystal state is a phase of matter which is exhibited by certain materials, in particular organic materials, over a particular temperature range. At one end of the temperature range, the liquid crystal material becomes a crystalline solid, while at another end of the temperature range it changes into a clear liquid. A primary characteristic of liquid crystal materials is the rod-like shape of their molecules. The application of electric fields to such materials tends to align the molecules in an ordered fashion to selectively allow radiation to pass through the cell 552.

In the embodiment of FIG. 18, the controllable liquid crystal display 550 of the orientation dependent radiation source 500 may include one or more color filters 120, as discussed above in connection with FIG. 13 and FIGS. 14A–C. In addition to, or in place of, one or more color filters 120, the controllable liquid crystal display 550 may include one or more non-uniform polarizing filters.

Additionally, as an alternative to the color filters described in connection with FIG. 13 and FIGS. 14A–C, the controllable liquid crystal display 550 may include other means for varying a color of one or more detectable centroids across the observation surface 106. For example, in a controllable transmissive liquid crystal display 550, the primary supply source 100 may include a pixel-oriented-type color source, such as would be employed in a computer or digital television monitor. From the foregoing, it should be appreciated that a variety of commercially available color controllable transmissive liquid crystal displays may be suitable for purposes of the invention.

Figure 19:
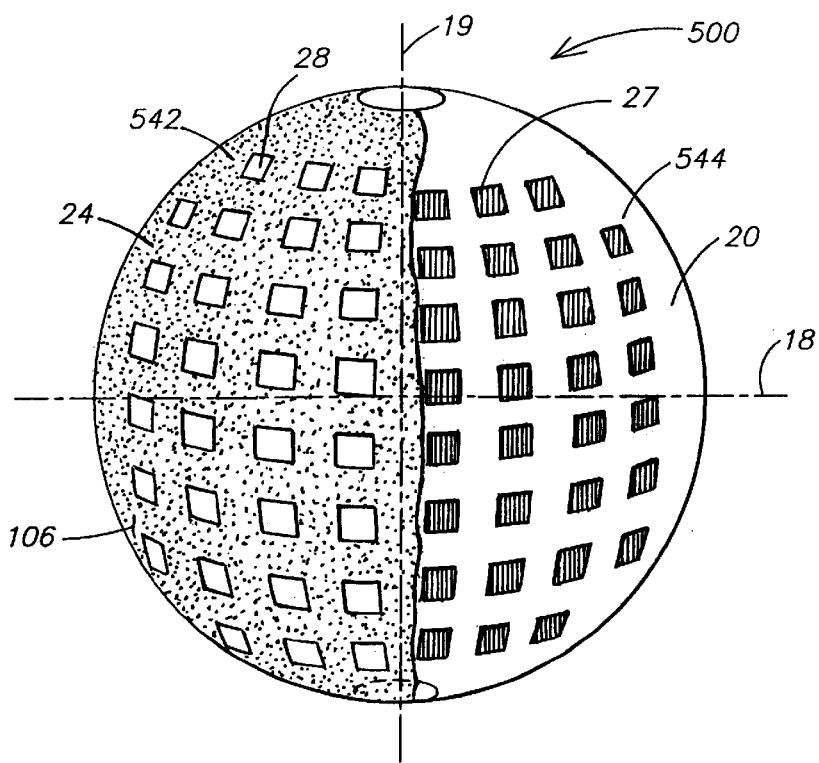
FIG. 19 is a diagram of an example of a volumetric orientation dependent radiation source according to one embodiment of the invention.

FIG. 19 shows another embodiment of the invention which combines concepts and features of the invention discussed above in connection with FIGS. 6, 11A–C, and 12A–C. In the embodiment of FIG. 19, an orientation dependent radiation source 500 according to the invention may be constructed and arranged to have a spherical or elliptical volumetric shape. For example, FIG. 19 shows the orientation dependent radiation 500 in the shape of a spherical volume which may be rotated about either the horizontal axis 18 or the vertical axis 19. A left portion of the sphere shown in FIG. 19 illustrates the first mask 24 having openings 28 arranged in a first surface pattern 542, while a right portion of the sphere shown in FIG. 19 as a cutaway view illustrates the second mask 20, including openings 27 arranged in a second surface pattern 544.

In FIG. 19, the first and second masks 24 and 20, respectively, may be constructed and arranged as concentric spherical shells, wherein the second mask 20 has a smaller radius than the first mask 24. Alternatively the first and second masks may be constructed and arranged as elliptical shells. While not explicitly shown in FIG. 19, the orientation dependent source 500, as in other embodiments, may include a primary supply source or a secondary supply source "inside" the spherical or elliptical volume.

For example, such an apparatus may include a point source located within the shells, for example, at a geometric center of the concentric spherical shells formed by the first and second masks, respectively, wherein the point source supplies radiation multi-directionally to "back-light" the first and second masks. Alternatively, the apparatus may include a reflected spherical or elliptical shell coupled to one or both of the first and second masks. In embodiments having spherical volumetric shapes, a reflective spherical shell may be concentric with the first and second masks and have a smaller radius than the second mask.

It should be appreciated that while FIG. 19 shows a spherical volumetric shape for an orientation dependent radiation source 500 according to one embodiment of the invention, in other embodiments an orientation dependent radiation source according to the invention may have an elliptical volumetric shape, as discussed above, or a variety of rectangular or other polygon volumetric shapes.

Having thus described at least one illustrative embodiment of the invention, various alterations, modifications and improvements will readily occur to those skilled in the art. Such alterations, modifications, and improvements are intended to be within the spirit and scope of the invention. Accordingly, the foregoing description is by way of example only and is not intended as limiting.

What is claimed is:

1. Apparatus comprising:
a first mask to substantially block radiation, the first mask defining an observation surface and including a first plurality of openings through which radiation is capable of passing; and
a second mask coupled to the first mask, the second mask including a second plurality of openings offset relative to the first plurality of openings such that radiation passing through at least the first plurality of openings produces an orientation dependent radiation pattern on the observation surface, the orientation dependent radiation pattern having at least one detectable centroid that varies in position across the observation surface based on a rotation angle of the first and second masks about at least one axis of rotation.

2. The apparatus of claim 1, wherein each opening of at least one of the first and second plurality of openings has a substantially rectilinear shape.

3. The apparatus of claim 1, wherein each opening of at least one of the first and second plurality of openings has an at least partially curved shape.

4. The apparatus of claim 1, wherein each opening of at least one of the first and second plurality of openings has a substantially circular shape.

5. The apparatus of claim 1, wherein each opening of the first and second plurality of openings is identically shaped.

6. The apparatus of claim 1, wherein at least some openings of the first and second plurality of openings are differently shaped.

7. The apparatus of claim 1, wherein the first plurality of openings is arranged as a first two-dimensional pattern.

8. The apparatus of claim 7, wherein the second plurality of openings is arranged as a second two-dimensional pattern.

9. The apparatus of claim 8, wherein the first two-dimensional pattern and the second two-dimensional pattern are arranged such that the at least one detectable centroid varies in position across the observation surface in two dimensions.

10. The apparatus of claim 9, wherein the observation surface has a rectangular shape.

11. The apparatus of claim 9, wherein the observation surface has a circular shape.

12. The apparatus of claim 9, wherein the observation surface has an elliptical shape.

13. The apparatus of claim 12, wherein:
the at least one axis of rotation includes a major axis and a minor axis in a plane of the observation surface; and
the first two-dimensional pattern and the second two-dimensional pattern are arranged such that a first sensitivity of the position of the at least one detectable centroid along the major axis based on a first rotation angle of the first and second masks about the minor axis is different from a second sensitivity of the position of the at least one detectable centroid along the minor axis based on a second rotation angle of the first and second masks about the major axis.

14. The apparatus of claim 1, further including a supply radiation source to direct the radiation toward the first mask and the second mask, the second mask being disposed between the source and the first mask to substantially block the radiation, the radiation passing through the second plurality of openings.

15. The apparatus of claim 14, wherein the supply source is coupled to the first and second masks.

16. The apparatus of claim 14, wherein the supply source includes a point source that radiates the radiation multidirectionally.

17. The apparatus of claim 14, wherein:
the at least one axis of rotation includes a first axis of rotation; and
an amount of radiation radiated by the source varies in a direction orthogonal to the first axis.

18. The apparatus of claim 17, wherein:
the at least one axis of rotation includes a first axis of rotation and a second axis of rotation, the second axis being orthogonal to the first axis, the first and second axes intersecting at a point on the observation surface; and
the amount of radiation radiated by the source varies radially along the observation surface from the point.

19. The apparatus of claim 14, wherein the second mask is formed by a controllable transmissive liquid crystal display.

20. The apparatus of claim 19, wherein the controllable transmissive liquid crystal display includes the supply source.

21. The apparatus of claim 20, wherein the controllable transmissive liquid crystal display includes means for varying a color of the at least one detectable centroid across the observation surface.

22. The apparatus of claim 14, wherein the supply source includes at least one reflector.

23. The apparatus of claim 22, wherein:
the at least one axis of rotation includes a first axis of rotation; and
a reflectance of the at least one reflector varies in a direction orthogonal to the first axis.

24. The apparatus of claim 23, wherein a granularity of the at least one reflector varies in the direction orthogonal to the first axis such that a specular reflection of the at least one reflector varies in the direction orthogonal to the first axis.

25. The apparatus of claim 23, wherein:
the at least one axis of rotation includes a first axis of rotation and a second axis of rotation, the second axis being orthogonal to the first axis, the first and second axes intersecting at a point of the observation surface; and
the reflectance of the at least one reflector varies in directions parallel to both the first and second axes, such that an intensity of the orientation dependent radiation pattern varies radially along the observation surface from the point.

26. The apparatus of claim 22, wherein the at least one reflector includes at least one retro-reflector to return incident radiation in a direction parallel to the incident radiation.

27. The apparatus of claim 26, wherein the at least one retro-reflector includes a sheet of retro reflecting material adhesively coupled to the second mask.

28. The apparatus of claim 26, wherein the at least one retro-reflector includes a spreadable mixture of suspended retro reflecting particles coating the second mask.

29. The apparatus of claim 22, wherein the second mask and the at least one reflector are formed by a controllable reflective liquid crystal display.

30. The apparatus of claim 29, wherein the controllable reflective liquid crystal display includes means for varying a color of the at least one detectable centroid across the observation surface.

31. The apparatus of claim 22, wherein the at least one reflector includes a controllable movable micro-mirror assembly.

32. The apparatus of claim 22, wherein:
the second mask is disposed between the at least one reflector and the first mask; and
a surface of the second mask facing the at least one reflector includes a reflective coating.

33. The apparatus of claim 32, wherein the at least one reflector includes at least one retro-reflector to return incident radiation in a direction parallel to the incident radiation.

34. The apparatus of claim 22, wherein the at least one reflector includes a pattern of surface perturbations.

35. The apparatus of claim 34, wherein the pattern of surface perturbations is arranged in a predetermined manner relative to the first and second plurality of openings.

36. The apparatus of claim 34, wherein the pattern of surface perturbations includes at least one curved bump.

37. The apparatus of claim 34, wherein the pattern of surface perturbations includes at least one triangular bump.

38. The apparatus of claim 34, wherein the at least one reflector includes at least one retro-reflector to return incident radiation in a direction parallel to the incident radiation.

39. The apparatus of claim 34, wherein:
the second mask is disposed between the at least one reflector and the first mask; and
a surface of the second mask facing the at least one reflector includes a reflective coating.

40. The apparatus of claim 39, wherein the at least one reflector includes at least one retro-reflector to return incident radiation in a direction parallel to the incident radiation.

41. The apparatus of claim 1, wherein the second mask includes at least one reflector.

42. The apparatus of claim 41, wherein:
the second mask includes a retro reflective pattern; and
the first plurality of openings is offset relative to the retro reflective pattern.

43. The apparatus of claim 42, wherein the second mask includes a plurality of retro reflective patches.

44. The apparatus of claim 42, wherein the second mask is formed from a sheet of retro reflecting material adhesively coupled to the first mask.

45. The apparatus of claim 42, wherein the second mask is formed from a spreadable mixture of suspended retro reflecting particles.

46. The apparatus of claim 42, wherein the at least one reflector includes a controllable movable micro-mirror assembly.

47. The apparatus of claim 1, wherein:
the second mask includes a plurality of polygon shaped rods, each polygon shaped rod having a plurality of faces and being aligned essentially parallel to a first axis of rotation of the first and second masks, each rod being laterally translatable along a direction parallel to the observation surface and orthogonal to the first axis, each rod being rotatable about a rod axis of rotation passing through a geometric center of the rod; and
the apparatus further includes at least one translational and rotational controller to independently rotate each rod about the rod axis and to independently translate each rod along the direction parallel to the observation surface such that the second plurality of openings is offset to the first plurality of openings.

48. The apparatus of claim 47, wherein:
each rod is a triangular shaped rod having three faces;
a first face of each rod includes a reflector;
a second face of each rod includes a retro-reflector; and
a third face of each rod includes a non-reflective material.

49. The apparatus of claim 48, wherein the at least one translational and rotational controller rotates the plurality of rods such that a same face of each rod is parallel to the observation surface.

50. The apparatus of claim 1, further including at least one orientation independent radiation source coupled to the first mask and the second mask to produce an orientation independent radiation pattern.

51. The apparatus of claim 50, wherein the at least one orientation independent radiation source produces the orientation independent radiation pattern on the observation surface.

52. The apparatus of claim 50, wherein:
the first mask, the second mask, and the at least one orientation independent radiation source form an assembly having opposing lateral surfaces orthogonal to the observation surface; and
the at least one orientation independent radiation source produces the orientation independent radiation pattern on at least one lateral surface.

53. The apparatus of claim 52, wherein:
each lateral surface has a first region and a second region;
a first orientation independent radiation source produces a first orientation independent radiation pattern in the first region of one lateral surface; and
a second orientation independent radiation source produces a second orientation independent radiation pattern in the second region of another lateral surface.

54. The apparatus of claim 50, wherein the at least one orientation independent radiation source is a reflector.

55. The apparatus of claim 1, further including a support structure to which the first mask and the second mask are coupled, the support structure being constructed and arranged so as to not obstruct the radiation.

56. The apparatus of claim 55, wherein the support structure is disposed between the first mask and the second mask.

57. The apparatus of claim 56, wherein the support structure is constructed and arranged as a lens.

58. The apparatus of claim 55, wherein:
the support structure includes a first surface and a second surface;
the first mask is coupled to the first surface; and
the second mask is coupled to the second surface.

59. The apparatus of claim 58, wherein the support structure is a substrate disposed between the first mask and the second mask, the substrate being substantially transmissive of the radiation.

60. The apparatus of claim 59, wherein a thickness of the substrate is variable during normal operation of the apparatus such that a first distance separating the first mask from the second mask is variable.

61. The apparatus of claim 60, wherein the substrate includes a temperature sensitive material such that the thickness varies with a substrate temperature.

62. The apparatus of claim 61, further including a temperature controller to control the substrate temperature.

63. The apparatus of claim 1, wherein the second mask is arranged substantially parallel to the first mask such that a surface of the second mask facing the first mask is substantially parallel to the observation surface, the second mask being separated from the first mask by a first distance.

64. The apparatus of claim 63, further including a lens coupled to the observation surface.

65. The apparatus of claim 63, wherein the first mask is substantially planar such that the observation surface is substantially planar.

66. The apparatus of claim 63, wherein the first mask is curved such that the observation surface is curved.

67. The apparatus of claim 66, wherein the second mask is curved and is arranged substantially parallel to the first mask.

68. The apparatus of claim 67, further including a curved reflector coupled to at least one of the first mask and the second mask and arranged substantially parallel to the first mask.

69. The apparatus of claim 67, wherein the observation surface has a concave shape.

70. The apparatus of claim 67, wherein the observation surface has a convex shape.

71. The apparatus of claim 70, wherein the first and second masks are constructed and arranged as concentric spherical shells, the second mask having a smaller radius than the first mask.

72. The apparatus of claim 71, further including a point source located within the concentric spherical shells to radiate the radiation multidirectionally.

73. The apparatus of claim 71, further including a reflective spherical shell coupled to at least one of the first mask and the second mask and concentric with the first and second masks, the reflective spherical shell having a smaller radius than the second mask.

74. The apparatus of claim 70, wherein the first and second masks are constructed and arranged as elliptical shells.

75. The apparatus of claim 63, wherein the first distance is variable during normal operation of the apparatus.

76. The apparatus of claim 75, wherein at least one of the first mask and the second mask are coupled to a translational controller to vary the first distance.

77. The apparatus of claim 63, further including a fluid disposed between the first mask and the second mask.

78. The apparatus of claim 77, further including a controllable valve to vary a volume of the fluid such that the first distance is variable during normal operation of the apparatus.

79. The apparatus of claim 63, further including a gas disposed between the first mask and the second mask.

80. The apparatus of claim 79, further including a controllable valve to vary a volume of the gas such that the first distance is variable during normal operation of the apparatus.

81. The apparatus of claim 63, further including at least one reflector coupled to the first and second masks and arranged substantially parallel to the first and second masks, the second mask being disposed between the first mask and the at least one reflector and separated from the at least one reflector by a second distance.

82. The apparatus of claim 81, wherein the second distance is variable during normal operation of the apparatus.

83. The apparatus of claim 1, wherein the radiation is visibly observable.

84. The apparatus of claim 83, further including at least one substantially transparent color filter through which the radiation passes.

85. The apparatus of claim 84, further including a source of radiation to direct the radiation toward the first mask and the second mask, wherein:
the second mask is disposed between the source and the first mask to substantially block the radiation, the radiation passing through the second plurality of openings; and
the source includes the at least one color filter.

86. The apparatus of claim 84, wherein at least one of the first mask and the second mask includes the at least one color filter.

87. The apparatus of claim 84, further including a substrate to which the first mask and the second mask are coupled, the substrate including the at least one color filter.

88. The apparatus of claim 87, further including:
a source of radiation to direct the radiation toward the first mask and the second mask, the second mask being disposed between the source and the first mask to substantially block the radiation, the radiation passing through the second plurality of openings; and a second color filter through which the radiation passes, the second color filter being disposed between the source and the second mask.

89. The apparatus of claim 84, wherein the at least one color filter is constructed and arranged such that a color of the at least one detectable centroid varies as a position of the at least one detectable centroid varies across the observation surface.

90. The apparatus of claim 89, wherein:

the at least one axis of rotation includes a first axis of rotation; and the color of the at least one detectable centroid varies along the observation surface in a direction orthogonal to the first axis.

91. The apparatus of claim 89, wherein:

the at least one axis of rotation includes a first axis of rotation and a second axis of rotation, the second axis being orthogonal to the first axis, the first and second axes intersecting at a point on the observation surface; and the color of the at least one detectable centroid varies radially along the observation surface from the point.

92. The apparatus of claim 1, further including at least one non-uniform polarizing filter through which the radiation passes.

93. The apparatus of claim 92, further including a source of radiation to direct the radiation toward the first mask and the second mask, wherein:

the second mask is disposed between the source and the first mask to substantially block the radiation, the radiation passing through the second plurality of openings; and the source includes the at least one non-uniform polarizing filter.

94. The apparatus of claim 92, further including a substrate to which the first mask and the second mask are coupled, the substrate including the at least one non-uniform polarizing filter.

95. The apparatus of claim 92, wherein the at least one non-uniform polarizing filter is constructed and arranged such that a polarization of the at least one detectable centroid varies as a position of the at least one detectable centroid varies across the observation surface.

96. The apparatus of claim 95, wherein:

the at least one axis of rotation includes a first axis of rotation; and the polarization of the at least one detectable centroid varies along the observation surface in a direction orthogonal to the first axis.

97. The apparatus of claim 95, wherein:

the at least one axis of rotation includes a first axis of rotation and a second axis of rotation, the second axis being orthogonal to the first axis, the first and second axes intersecting at a point on the observation surface; and the polarization of the at least one detectable centroid varies radially along the observation surface from the point.

98. The apparatus of claim 95, further including at least one color filter through which the radiation passes, the color filter being constructed and arranged such that a color of the at least one detectable centroid varies as the position of the at least one detectable centroid varies across the observation surface.

99. The apparatus of claim 1, further including at least one neutral density filter through which the radiation passes.

100. The apparatus of claim 99, further including a source of radiation to direct the radiation toward the first mask and the second mask, wherein:

the second mask is disposed between the source and the first mask to substantially block the radiation, the radiation passing through the second plurality of openings; and the source includes the at least one neutral density filter.

101. The apparatus of claim 99, further including a substrate to which the first mask and the second mask are coupled, the substrate including the at least one neutral density filter.

102. The apparatus of claim 99, wherein the at least one neutral density filter is constructed and arranged such that an intensity of the at least one detectable centroid varies as a position of the at least one detectable centroid varies across the observation surface.

103. The apparatus of claim 102, wherein:

the at least one axis of rotation includes a first axis of rotation; and the intensity of the at least one detectable centroid varies along the observation surface in a direction orthogonal to the first axis.

104. The apparatus of claim 102, wherein:

the at least one axis of rotation includes a first axis of rotation and a second axis of rotation, the second axis being orthogonal to the first axis, the first and second axes intersecting at a point on the observation surface; and the intensity of the at least one detectable centroid varies radially along the observation surface from the point.

105. The apparatus of claim 102, further including at least one color filter through which the radiation passes, the color filter being constructed and arranged such that a color of the at least one detectable centroid varies as the position of the at least one detectable centroid varies across the observation surface.

106. The apparatus of claim 105, further including at least one non-uniform polarization filter through which the radiation passes, the non-uniform polarization filter being constructed and arranged such that a polarization of the at least one detectable centroid varies as the position of the at least one detectable centroid varies across the observation surface.

107. A system, comprising:

at least one orientation dependent radiation source to direct orientation dependent radiation to an observation area, the at least one orientation dependent radiation source having an observation surface from which the orientation dependent radiation is directed to the observation area, the at least one orientation dependent radiation source being constructed and arranged such that the orientation dependent radiation has at least one detectable property that varied with a rotation angle of the source about at least one axis of rotation, the at least one detectable property including a spatial distribution of the orientation dependent radiation on the observation superface; and at least one radiation source located within the observation area to detect the orientation dependent radiation.

108. The system of claim 107, wherein the at least one orientation dependent radiation source includes a primary radiation source.

109. The system of claim 107, wherein:
the at least one axis of rotation includes a first axis passing through the at least one orientation dependent radiation source, the at least one orientation dependent radiation source having a reference position about the first axis;
the observation area is located at a radius from the first axis of rotation along a reference position normal extending from the observation surface when the at least one orientation dependent radiation source is in the reference position;
the observation area spans a first observation angle, relative to the reference position, about the first axis, the first observation angle being in a first plane orthogonal to the first axis and including the reference position normal;
the first observation angle is substantially less than a first maximum rotation angle of the at least one orientation dependent radiation source about the first axis, the first maximum rotation angle being relative to the reference position in the first plane; and
the at least one orientation dependent radiation source is capable of directing the orientation dependent radiation to the observation area at a plurality of first rotation angles about the first axis up to the first maximum rotation angle.

110. The system of claim 109, wherein:
the at least one axis of rotation includes a second axis of rotation passing through the at least one orientation dependent radiation source, the second axis of rotation being orthogonal to and intersecting the first axis;
the observation area spans a second observation angle, relative to the reference position, about the second axis, the second observation angle being in a second plane orthogonal to the second axis and including the reference position normal;
the second observation angle is substantially less than a second maximum rotation angle of the at least one orientation dependent radiation source about the second axis, the second maximum rotation angle being relative to the reference position in the second plane; and
the at least one orientation dependent radiation source is capable of directing the orientation dependent radiation to the observation area at a plurality of second rotation angles about the second axis up to the second maximum rotation angle.

111. The system of claim 107, further including at least one orientation independent radiation source to direct orientation independent radiation to the observation area.

112. The system of claim 111, wherein the at least one orientation independent radiation source is coupled to the orientation dependent radiation source.

113. The system of claim 107, wherein the at least one orientation dependent radiation source includes:
a first mask to substantially block source radiation, the first mask defining the observation surface and including a first plurality of openings through which the source radiation is capable of passing; and
a second mask coupled to the first mask, the second mask including a second plurality of openings offset relative to the first plurality of openings such that the source radiation passing through at least the first plurality of openings produces the orientation dependent radiation on the observation surface, the orientation dependent radiation including at least one centroid detectable from the observation area that varies in position across the observation surface based on the rotation angle of the orientation dependent radiation source about the at least one axis of rotation.

114. The system of claim 113, further including at least one orientation independent radiation source to direct orientation independent radiation to the observation area independent of the rotation angle, wherein the at least one radiation sensor detects the at least one centroid from the at least one orientation dependent radiation source and the orientation independent radiation.

115. The system of claim 114, wherein the at least one orientation independent radiation source is coupled to the at least one orientation dependent radiation source.

116. The system of claim 113, wherein the at least one orientation dependent radiation source further includes a primary source to direct the source radiation toward the first and second masks, the second mask being disposed between the primary source and the first mask to substantially block the source radiation, the source radiation passing through the second plurality of openings to produce the orientation dependent radiation.

117. The system of claim 113, wherein:
the at least one orientation dependent radiation source includes a reflector coupled to the first mask and the second mask to reflect the source radiation, the second mask being disposed between the reflector and the first mask to substantially block the source radiation, the source radiation passing through the second plurality of openings to produce the orientation dependent radiation;
the at least one orientation independent radiation source includes at least one orientation independent reflector; and
the system further includes a primary source to direct the source radiation toward the at least one orientation dependent radiation source and the at least one orientation independent reflector.

118. The system of claim 117, wherein the primary source is located adjacent to the at least one radiation sensor.

119. The system of claim 117, wherein the at least one orientation dependent radiation source is coupled to an object.

120. The system of claim 107, wherein the spatial distribution includes a position of the orientation dependent radiation on the observation surface, wherein the position varies with the rotation angle.

121. The system of claim 107, wherein the at least one detectable property further includes an intensity of the orientation dependent radiation, wherein the intensity varies with the rotation angle.

122. The system of claim 107, wherein the at least one detectable property further includes a polarization of the orientation dependent radiation, wherein the polarization varies with the rotation angle.

123. The system of claim 107, wherein the at least one detectable property further includes a wavelength of the orientation dependent radiation, wherein the wavelength varies with the rotation angle.

124. The system of claim 107, wherein:
the orientation dependent radiation includes at least two centroids of radiation on the observation surface, each centroid being detectable from the observation area; and
the at least one detectable property further includes a distance between the at least two centroids of radiation, wherein the distance between the at least two centroids varies with the rotation angle.

125. The system of claim 107, wherein:

the at least one detectable property further includes at least one of an intensity of the orientation dependent radiation, a polarization of the orientation dependent radiation, and a wavelength of the orientation dependent radiation, wherein the at least one of the intensity, the polarization, and the wavelength varies with the rotation angle.

126. The system of claim 107, wherein:

the orientation dependent radiation includes at least two radiation patterns on the observation surface, each radiation pattern being detectable from the observation area; and the at least one detectable property includes a differential property between the at least two radiation patterns, wherein the differential property between the at least two radiation patterns varies with the rotation angle.

127. The system of claim 126, wherein the differential property includes a differential polarization between the at least two radiation patterns.

128. The system of claim 126, wherein the differential property includes a distance between the at least two radiation patterns.

129. A method for producing an orientation dependent radiation pattern on an observation surface, comprising a step of:

varying a surface area of a radiation source exposed through the observation surface in response to a rotation of the observation surface about at least one axis of rotation to produce at least one detectable centroid having a position that varies across the observation surface corresponding to the rotation.

130. The method of claim 129, wherein the step of varying the surface area of the radiation source includes a step of filtering radiation passing through the observation surface.

131. The method of claim 130, wherein the step of filtering includes a step of selectively filtering the radiation such that an intensity of the at least one detectable centroid varies with the position.

132. The method of claim 130, wherein the step of filtering includes a step of color filtering the radiation such that a color of the at least one detectable centroid varies with the position.

133. The method of claim 130, wherein the step of filtering includes a step of polarization filtering the radiation such that a polarization of the at least one detectable centroid varies with the position.

134. The method of claim 133, wherein the step of filtering includes a step of color filtering the radiation such that both a color and the polarization of the at least one detectable centroid vary with the position.

135. The method of claim 130, wherein the step of filtering includes a step of passing the radiation through a first plurality of openings in the observation surface.

136. The method of claim 135, wherein the step of filtering further includes a step of passing the radiation through a second plurality of openings coupled to the observation surface, the second plurality of openings being offset relative to the first plurality of openings.

137. The method of claim 136, wherein the radiation source is a reflector.

138. The method of claim 135, wherein:

the radiation source is a reflective pattern; and the step of filtering includes a step of coupling the reflective pattern to the observation surface such that the first plurality of openings is offset relative to the reflective pattern.

139. An apparatus, comprising:

at least one orientation dependent radiation source to direct orientation dependent radiation to an observation area, the at least one orientation dependent radiation source having an observation surface from which the orientation dependent radiation is directed to the observation area, the at least one orientation dependent radiation source being constructed and arranged such that the orientation dependent radiation has at least one detectable property that varies with a rotation angle of the source about at least one axis of rotation, the at least one detectable property including a spatial distribution of the orientation dependent radiation on the observation surface.

140. The apparatus of claim 139, wherein the spatial distribution includes a position of the orientation dependent radiation, wherein the position varies with the rotation angle.

141. The apparatus of claim 139, wherein the at least one detectable property further includes an intensity of the orientation dependent radiation, wherein the intensity varies with the rotation angle.

142. The apparatus of claim 139, wherein the at least one detectable property further includes a polarization of the orientation dependent radiation, wherein the polarization varies with the rotation angle.

143. The apparatus of claim 139, wherein the at least one detectable property further includes a wavelength of the orientation dependent radiation, wherein the wavelength varies with the rotation angle.

144. The apparatus of claim 139, wherein:

the orientation dependent radiation includes at least two centroids of radiation on the observation surface, each centroid being detectable from the observation area; and the at least one detectable property further includes a distance between the at least two centroids of radiation, wherein the distance between the at least two centroids varies with the rotation angle.

145. The apparatus of claim 139, wherein:

the at least one detectable property further includes at least one of an intensity of the orientation dependent radiation, a polarization of the orientation dependent radiation, and a wavelength of the orientation dependent radiation, wherein the at least one of the intensity, the polarization, and the wavelength varies with the rotation angle.

146. The apparatus of claim 139, wherein:

the orientation dependent radiation includes at least two radiation patterns on the observation surface, each radiation pattern being detectable from the observation area; and the at least one detectable property further includes a differential property between the at least two radiation patterns, wherein the differential property between the at least two radiation patterns varies with the rotation angle.

147. The apparatus of claim 146, wherein the differential property includes a differential polarization between the at least two radiation patterns.

148. The apparatus of claim 147, wherein the differential property includes a distance between the at least two radiation patterns.

149. An apparatus comprising:

a first orientation dependent radiation source to produce a first orientation dependent radiation pattern on a first observation surface of the first orientation dependent radiation source, the first orientation dependent radiation pattern varying in position across the observation surface in a first direction based on a rotation angle of the first orientation dependent radiation source about at least one axis of rotation; and at least one additional orientation dependent radiation source coupled to the first orientation dependent radiation source, the at least one additional orientation dependent radiation source including a second orientation dependent radiation source to produce a second orientation dependent radiation pattern on a second observation surface of the second orientation dependent radiation source, the second orientation dependent radiation pattern varying in position across the second observation surface in a second direction based on the rotation angle of the first and second orientation dependent radiation sources, the first and second directions being different.

150. The apparatus of claim 149, wherein:

the first orientation dependent radiation pattern varies in position along a first axis;

the second orientation dependent radiation pattern varies in position along a second axis;

the first axis is parallel to the second axis; and the first direction is opposite to the second direction.

151. The apparatus of claim 149, wherein:

the first observation surface defines a first plane;

the second observation surface defines a second plane; and the first plane is parallel to the second plane.

152. The apparatus of claim 149, wherein the first and second observation surfaces are arranged so as to not substantially obstruct each other.

153. The apparatus of claim 152, wherein the first and second orientation dependent radiation patterns are each detectable from a same observation point.

154. The apparatus of claim 152, wherein the first and second observation surfaces are in a same plane.

155. The apparatus of claim 149, wherein each of the first orientation dependent radiation pattern and the second orientation dependent radiation pattern includes at least one detectable centroid of radiation.

156. The apparatus of claim 149, wherein each of the first and second orientation dependent radiation sources has an essentially rectangular shape, the rectangular shape having a long side and a short side.

157. The apparatus of claim 156, wherein the first and second orientation dependent radiation sources are arranged such that a long side of the first orientation dependent radiation source is adjacent to and parallel with a long side of the second orientation dependent radiation source.

158. The apparatus of claim 157, wherein:

a first axis passes through the first observation surface and is parallel with the long side of the first orientation dependent radiation source;

a second axis passes through the second observation surface and is parallel with the long side of the second orientation dependent radiation source;

the at least one axis of rotation includes a first rotation axis, the first rotation axis being perpendicular to both the first axis and the second axis; and the rotation angle is about the first rotation axis.

159. The apparatus of claim 158, wherein:

the first orientation dependent radiation pattern varies in position along the first axis;

the second orientation dependent radiation pattern varies in position along the second axis; and the first direction is opposite to the second direction.

160. The apparatus of claim 149, wherein each of the first and second orientation dependent radiation sources includes:

a first mask to substantially block radiation, the first mask defining a respective observation surface and including a first plurality of openings through which radiation is capable of passing; and a second mask coupled to the first mask, the second mask including a second plurality of openings offset relative to the first plurality of openings such that radiation passing through at least the first plurality of openings produces a respective orientation dependent radiation pattern on the respective observation surface.

161. In a system including at least two orientation dependent radiation sources coupled together, the at least two orientation dependent radiation sources including a first orientation dependent radiation source having a first surface area and a first observation surface, and a second orientation dependent radiation source having a second surface area and a second observation surface, a method for producing at least two orientation dependent radiation patterns, the method comprising steps of:

exposing the first surface area of the first radiation source through the first observation surface;

exposing the second surface area of the second radiation source through the second observation surface; and varying the exposed first and second surface areas in response to a rotation of the first and second observation surfaces about at least one common axis of rotation to produce at least a first radiation pattern on the first observation surface and a second radiation pattern on the second observation surface, the first radiation pattern having a first position that varies across the first observation surface in a first direction in response to the rotation, and the second radiation pattern having a second position that varies across the second observation surface in a second direction in response to the rotation, the first and second directions being different.

162. An apparatus, comprising:

an orientation dependent radiation source to produce at least first and second orientation dependent radiation patterns on an observation surface of the orientation dependent radiation source, the first orientation dependent radiation pattern varying in position across the observation surface in a first direction based on a rotation angle of the orientation dependent radiation source about at least one axis of rotation, and the second orientation dependent radiation pattern varying in position across the observation surface in a second direction based on the rotation angle, the first and second directions being different.

163. A method for producing an orientation dependent radiation pattern on an observation surface, comprising steps of:

exposing a surface area of at least one radiation source through the observation surface; and varying the exposed surface area of the at least one radiation source in response to a rotation of the observation surface about at least one axis of rotation to produce at least a first radiation pattern and a second radiation pattern, the first radiation pattern having a first position that varies across the observation surface in a first direction in response to the rotation, and the second radiation pattern having a second position that varies across the observation surface in a second direction in response to the rotation, the first and second directions being different.

164. In a system including at least one radiation sensor and at least one orientation dependent radiation source having a geometric center and at least two end faces, each end face located at a radius from the geometric center and including an end face radiation source to direct radiation radially outward from the geometric center, a method for measuring a rotational distance around a circular path from a reference point on the circular path, the circular path having the geometric center and the radius such that each end face of the at least one orientation dependent radiation source travels essentially along the circular path in response to a rotation of the orientation dependent radiation source about an axis of rotation passing through the geometric center, a first radiation sensor of the at least one radiation sensor located at the reference point, the method comprising steps of:

rotating the at least one orientation dependent radiation source about the axis of rotation; and counting a number of radiation detection events as each end face radiation source passes by the first radiation sensor located at the reference point.

165. The method of claim 164, further including a step of determining the rotational distance traveled by the at least one orientation dependent radiation source based on the number of radiation detection events and the radius.

166. The method of claim 165, further including steps of:

measuring a time between each radiation detection event; and determining a rotational speed of the at least one orientation dependent radiation source based on the measured time and the rotational distance.

167. The method of claim 165, wherein:

the at least one orientation dependent radiation source is constructed and arranged to produce at least one orientation dependent radiation pattern on at least one observation surface of the at least one orientation dependent radiation source, the at least one orientation dependent radiation pattern having a detectable property that varies in response to the rotation about the axis of rotation; and the step of determining the rotational distance traveled by the at least one orientation dependent radiation source further includes steps of:

detecting the orientation dependent radiation pattern at the reference point; and determining the rotational distance based on the detected orientation dependent radiation pattern, the number of radiation detection events, and the radius.

168. The method of claim 164, wherein the at least one orientation dependent radiation source has a polygon volumetric shape and includes a plurality of end faces, each end face located at the radius from the geometric center and including an end face radiation source to direct radiation radially outward from the geometric center, wherein the step of determining the rotational distance traveled by the at least one orientation dependent radiation source based on the number of radiation detection events and the radius includes a step of determining the rotational distance traveled by the at least one orientation dependent radiation source based on the number of radiation detection events, the radius, and the number of end faces.

* * * * *